US012467653B2

(12) United States Patent
Furman et al.

(10) Patent No.: US 12,467,653 B2
(45) Date of Patent: Nov. 11, 2025

(54) SYSTEM AND METHOD FOR CONTROLLING INDOOR ENVIRONMENTS

(71) Applicant: FT Energy Controls, LLC, Pittsburgh, PA (US)

(72) Inventors: Richard C. Furman, Atlanta, GA (US); Zachary M. Thomas, Pittsburgh, PA (US)

(73) Assignee: FT Energy Controls, LLC, Pittsburgh, PA (US)

( * ) Notice: Subject to any disclaimer, the term of this patent is extended or adjusted under 35 U.S.C. 154(b) by 105 days.

(21) Appl. No.: 18/431,545

(22) Filed: Feb. 2, 2024

(65) Prior Publication Data
US 2024/0263827 A1 Aug. 8, 2024

Related U.S. Application Data

(60) Provisional application No. 63/581,064, filed on Sep. 7, 2023, provisional application No. 63/443,028, filed on Feb. 2, 2023.

(51) Int. Cl.
| | |
|---|---|
| *F24F 11/85* | (2018.01) |
| *F24F 11/84* | (2018.01) |
| *F24F 110/10* | (2018.01) |
| *F24F 110/20* | (2018.01) |
| *F24F 140/20* | (2018.01) |

(52) U.S. Cl.
CPC .............. *F24F 11/85* (2018.01); *F24F 11/84* (2018.01); *F24F 2110/10* (2018.01); *F24F 2110/20* (2018.01); *F24F 2140/20* (2018.01)

(58) Field of Classification Search
CPC .. F24F 11/85; F24F 11/84; F24F 11/30; F24F 11/46; F24F 11/83; F24F 2110/10; F24F 2110/20; F24F 2140/20
See application file for complete search history.

(56) References Cited

U.S. PATENT DOCUMENTS

| | | | |
|---|---|---|---|
| 3,625,022 | A | 12/1971 | Johnson |
| 4,516,720 | A | 5/1985 | Chaplin |

(Continued)

FOREIGN PATENT DOCUMENTS

| | | |
|---|---|---|
| CN | 201368521 Y | 12/2009 |
| CN | 203375527 U | 1/2014 |

(Continued)

OTHER PUBLICATIONS

Lawrosa, Do It Yourself How-Tos on Diverter Tees, Oct. 13, 2013, https://www.doityourself.com/forum/boilers-home-heating-steam-hot-water-systems/507662-air-lock.html.

(Continued)

*Primary Examiner* — Marc E Norman
(74) *Attorney, Agent, or Firm* — Zachary M. Thomas

(57) ABSTRACT

An air conditioning system including a conditioning unit (e.g., fan coil unit) and a control system are provided for efficiently and effectively conditioning indoor air. Some embodiments address temperature control (e.g., including heating and cooling), humidity control, and air quality control, while also introducing conditioned outdoor air. One aspect relates to a control system that delivers liquid to a coil in the conditioning unit at a specified input temperature and flow rate (or specified input temperature and temperature drop across the coil) to meet both sensible and latent cooling demands.

21 Claims, 8 Drawing Sheets

(56) References Cited

U.S. PATENT DOCUMENTS

| | | | |
|---|---|---|---|
| 5,139,549 | A | 8/1992 | Knodel et al. |
| 5,520,328 | A | 5/1996 | Bujak |
| 8,556,187 | B1 | 10/2013 | Darcy |
| 9,625,222 | B2 | 4/2017 | Fischer |
| 10,649,508 | B1 | 5/2020 | Smith |
| 11,054,167 | B2 | 7/2021 | Furman et al. |
| 2004/0188082 | A1 | 9/2004 | Riello |
| 2012/0291468 | A1 | 11/2012 | Kato et al. |
| 2013/0199772 | A1* | 8/2013 | Fischer ................ F24F 5/0089 165/96 |
| 2015/0032267 | A1 | 1/2015 | Lindelof et al. |
| 2015/0334878 | A1 | 11/2015 | Long et al. |
| 2018/0372345 | A1 | 12/2018 | Fischer et al. |
| 2020/0348040 | A1* | 11/2020 | Furman .................. F24F 11/47 |
| 2021/0018206 | A1 | 1/2021 | Barooah |
| 2022/0154972 | A1 | 5/2022 | Furman et al. |
| 2023/0221031 | A1 | 7/2023 | Furman et al. |

FOREIGN PATENT DOCUMENTS

| | | |
|---|---|---|
| CN | 204404420 U | 6/2015 |
| CN | 105180244 | 12/2015 |
| DE | 102008000392 A1 | 10/2008 |
| JP | H09166346 A | 6/1997 |
| RU | 2300709 C2 | 6/2017 |
| WO | 2008072992 A1 | 6/2008 |
| WO | 2014094215 A1 | 6/2014 |

OTHER PUBLICATIONS

Weldon, Commercial Inspection Tips: Water Cooling in Buildings, ASHI Reporter, Oct. 2007, http://www.ashireporter.org/HomeInspection/Articles/Commercial-Inspection-Tips-Water-Co.

Britt, 4 Piping Strategies for Active Chilled Beam Systems, Jan. 29, 2016, http://blogs.heattransfersales.com/blog/4-piping-strategies-for-active-chilled-beam-systems.

Bell & Gossett, Bulletin No. TEH 875—Single Coil Instantaneous Room by Room Heating-Cooling Systems, pp. 25-26, 28, 34-35—ITT, 1965.

Taco, LOFlo injection pumping, Taco, Inc., Cranston, RI, https://www.tacocomfort.com/documents/FileLibrary/100-85.pdf.

SEMCO. NEUTON Controlled Chilled Beam Pump Module—Technical Guide, 2018, FlaktGroup SEMCO, Columbia, Missouri, http://info.semcohvac.com/tech-neuton.

AAON, AAONAire Energy Recovery, AAON, Inc., Tulsa, OK, R85590-110103 p. 5. https://www.aaon.com/Documents/Technical/AAONAire_110103.pdf.

Twa Panel Systems, Inc., How Twa MAC Beams Work, Alberta, Canada, 2001, http://www.twapanels.ca/chilledbeamworks.html.

* cited by examiner

SYSTEM AND METHOD FOR CONTROLLING INDOOR ENVIRONMENTS

RELATED APPLICATION

This application claims priority under 35 U.S.C. § 119(e) to U.S. provisional patent application, U.S. Ser. No. 63/581,064, filed Sep. 7, 2023, and U.S. provisional patent application, U.S. Ser. No. 63/443,028, filed Feb. 2, 2023, both of which are herein incorporated by reference in their entirety.

TECHNICAL FIELD

The present disclosure relates to at least the field of conditioning of indoor environments.

BACKGROUND

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

Heating, ventilation, and air conditioning (HVAC) technologies have been developed for conditioning indoor air with the goal of effectively and efficiently providing comfort for occupants and/or satisfactory indoor conditions for property.

In U.S. Pat. No. 11,054,167 issued Jul. 6, 2021 (hereinafter the Furman Patent) which is herein incorporated by reference in its entirety, inventors Richard Furman ("Furman") and Zachary M. Thomas ("Thomas") disclosed, inter alia, a control system for controlling liquid flow from a supply into a terminal unit where the control system had a supply input port; a load return port; a recirculation pump for pumping liquid from a pump input port to a pump output port, the pump input port connected to receive a first portion of liquid flowing from the load return port; a junction configured to combine liquid flowing from the pump output port with liquid flowing from the supply input port; a load input port configured to receive such combined liquid from the junction; a supply return port connected to receive a remaining portion of the liquid flowing from the load return port; a control valve to restrict flow of liquid between the supply input port and the supply return port; a sensor; and a control module to control the control valve based at least in part on a measurement from the sensor.

In United States Published Patent Application Number 2022/0154972 published May 19, 2022 (hereinafter the '972 application) which is herein incorporated by reference in its entirety, inventors Furman and Thomas disclosed, inter alia, a control system for managing latent and sensible cooling in a terminal unit by measuring the rates of latent and sensible cooling and controlling them based on set points.

In United States Published Patent Application Number 2023/0221031 published Jul. 13, 2023 (hereinafter the '031 application) which is herein incorporated by reference in its entirety, Inventors Furman and Thomas disclosed, inter alia, a terminal unit that monitors and controls sensible and latent cooling rates to simultaneously meet temperature and humidity setpoints for the conditioned space. A sensor suite provides measurements for monitoring cooling rates and a control system controls actuators to meet the sensible and latent cooling requirements. The terminal unit may have a secondary recirculation air intake that bypasses the cooling coil to warm supply air prior to exiting the terminal unit.

It is noted that Furman is listed as Richard C. Furman in the '972 and '031 application).

SUMMARY

A system and terminal unit are provided for efficiently and effectively conditioning indoor air.

One aspect relates to a system comprising a supply input port; a load return port; a recirculation pump for pumping liquid from a pump input port to a pump output port, the pump input port connected to receive a first portion of liquid flowing from the load return port; a junction to combine liquid flowing from the pump output port with liquid flowing from the supply input port; a load input port to receive such combined liquid from the junction; a supply return port connected to receive a remaining portion of the liquid flowing from the load return port; an actuator comprising a control pump to control flow of liquid between the supply input port and the supply return port at least in part by modulating a speed of the control pump; a sensor to measure a property of the liquid flowing through the load input port; and a control module to control the control pump and the recirculation pump based at least in part on a measurement from the sensor.

In some embodiments of the system the sensor is a first temperature sensor and the property is temperature and the recirculation pump is a variable-speed recirculation pump, the system further comprising a second temperature sensor to measure a temperature of the liquid flowing into the load return port, wherein the control module modulates the control pump and modulates the recirculation pump to achieve a target temperature at the first temperature sensor and to simultaneously achieve a target temperature difference between the two temperature sensors.

In some embodiments of the system the control module determines the target temperature and the target temperature difference between the two temperature sensors based at least in part on a temperature of a conditioned space, a humidity of the conditioned space, a target temperature of the conditioned space, and a target humidity of the conditioned space.

In some embodiments, the system further comprises a flow rate sensor to measure a flow rate of the liquid flowing through the load input port, wherein the control module calculates an energy transfer rate based on the flow rate and a temperature difference between the two temperature sensors, and adjusts the modulation of the control pump and the recirculation pump in response to the energy transfer rate being different from a target energy transfer rate.

In some embodiments of the system the actuator further comprises a control valve operably connected in series with the control pump and the control module at least partially opens the control valve during operation of the control pump.

In some embodiments of the system the control valve has two states, fully open, and fully closed, the control module transmits to the control valve a binary control signal specifying one of the two states, and the control module fully opens the control valve during operation of the control pump.

In some embodiments of the system the control valve is a modulated control valve and the control module transmits to the control valve a control signal specifying a position of the control valve.

In some embodiments of the system the sensor comprises a first temperature sensor to measure a temperature of the liquid flowing through the load input port, and a flow rate sensor to measure a flow rate of the liquid flowing through the load input port, the recirculation pump is a variable-speed recirculation pump, and the control module modulates the control pump and the recirculation pump to achieve a target temperature at the first temperature sensor and a target flow rate at the flow rate sensor.

In some embodiments of the system the control pump in an OFF state prevents flow of liquid between the supply input port and the supply return port.

Another aspect relates to a system for conditioning air in a conditioned space, the system comprises a conditioning unit and a control system. The conditioning unit has a mixing chamber; a recirculation air port for receiving first recirculation air and connected to the mixing chamber by a first duct; a cooling coil having an coil input port and a coil output port, the cooling coil within the first duct; a fan to generate the flow of first recirculation air through the cooling coil; a conditioned air port for receiving conditioned air and connected to the mixing chamber by a second duct; and a supply air port for providing supply air port for providing supply air, the supply air port connected to the mixing chamber. The control system has a supply input port; a load return port connected to the coil output port to receive liquid returning from the cooling coil; a recirculation pump for pumping liquid from a pump input port to a pump output port, the pump input port operably connected to receive a first portion of liquid flowing from the load return port; a junction to combine liquid flowing from the pump output port with liquid flowing from the supply input port; a load input port to receive the combined liquid from the junction, the load input port operably connected to the coil input port and to provide the combined liquid to the coil; a supply return port connected to receive a remaining portion of the liquid flowing from the load return port; an actuator comprising a control pump to control flow of liquid between the supply input port and the supply return port at least in part by modulating a speed of the control pump; a sensor to measure a property of the liquid flowing through the load input port; and a control module to control the control pump and the recirculation pump based at least in part on a measurement from the sensor.

In some embodiments of the system the sensor is a first temperature sensor and the property is a first temperature; the control system further comprises a second temperature sensor for measuring a second temperature of the liquid flowing through the load return port; the control module determines a target rate of latent cooling and a target rate of sensible cooling based at least in part on a temperature of the air in the conditioned space, a humidity of the conditioned space, a target temperature of the conditioned space, and a target humidity of the conditioned space; the control module determines a target temperature for liquid entering the cooling coil and a target temperature for liquid exiting the cooling coil based at least in part on the target rate of latent cooling and the target rate of sensible cooling; and the control module controls the control pump and the recirculation pump to achieve the target temperature for liquid entering the cooling coil and the target temperature for liquid exiting the cooling coil. In some embodiments, the system further comprises a plurality of sensors to measure a rate of latent cooling and a rate of sensible cooling provided through the conditioning unit, wherein the control module determines the target rate of latent cooling and the target rate of sensible cooling based at least in additional part on he measured rate of latent cooling and the measured rate of sensible cooling.

In some embodiments of the system the sensor is a temperature sensor and the property is temperature; the control system further comprises a flow rate sensor to measure a flow rate of liquid through the cooling coil; the control module determines a target rate of latent cooling and a target rate of sensible cooling based at least in part on a temperature of the air in the conditioned space, a humidity of the conditioned space, a target temperature of the conditioned space, and a target humidity of the conditioned space; the control module determines a target temperature for liquid entering the cooling coil and a target flow rate for liquid flowing through the cooling coil based at least in part on the target rate of latent cooling and the target rate of sensible cooling; and the control module controls the control pump and the recirculation pump to achieve the target temperature for liquid entering the cooling coil and the target flow rate for liquid flowing through the cooling coil. In some embodiments, the system further comprises a plurality of sensors to measure a rate of latent cooling and a rate of sensible cooling provided through the conditioning unit, wherein the control module determines the target rate of latent cooling and the target rate of sensible cooling based at least in additional part on the measured rate of latent cooling and the measured rate of sensible cooling.

In some embodiments of the system the control module determines the target temperature for liquid entering the cooling coil and the target flow rate for liquid flowing through the cooling coil by executing a computational model of the system.

In some embodiments of the system the control system further comprises a non-transitory computer-readable storage medium having recorded thereon a database relating at least latent cooling rate and latent heating rate to temperature for liquid entering the cooling coil and flow rate for liquid through the cooling coil; and the control module determines the target temperature for liquid entering the cooling coil and the target flow rate for liquid flowing through the cooling coil based at least in part from a look-up from the database.

In some embodiments of the system the control module updates the database based on measurements of latent cooling rate, latent heating rate, the temperature for liquid entering the cooling coil and the flow rate for liquid through the cooling coil. In some embodiments of the system the database comprises entries from a system model. In some embodiments of the system the database comprises entries from empirical measurements. In some embodiments of the system each entry in the database further specifies a corresponding temperature and humidity of the air in the conditioned space. In some embodiments of the system each entry in the database further specifies an air flow rate through the cooling coil.

In some embodiments of the system the control module determines the target temperature for liquid entering the cooling coil and the target flow rate for liquid flowing through the cooling coil by interpolating between two or more entries in the database.

In some embodiments of the system the control module performs one or more calibration tests to adjust the database entries to reflect the installed conditions of the conditioning unit and control system in the conditioned space.

In some embodiments the system further comprises an air quality sensor to measure an indicator of air quality of the first recirculation air; and a damper located in the second duct, wherein the control module modulates the damper to control the flow of the conditioned air based at least in part on an air quality target and a measurement from the air quality sensor.

Still another aspect relates to a system comprising a supply input port; a load return port;

a variable-speed recirculation pump for pumping liquid from a pump input port to a pump output port, the pump input port connected to receive a first portion of liquid flowing from the load return port; a junction to combine liquid flowing from the pump output port with liquid flowing from the supply input port; a load input port to receive such combined liquid from the junction; a supply return port connected to receive a remaining portion of the liquid flowing from the load return port; an actuator comprising a variable-speed control pump to control flow of liquid between the supply input port and the supply return port at least in part by modulating a speed of the control pump; a temperature sensor to measure a temperature of the liquid flowing through the load input port; a second sensor to measure a property of the liquid flowing through the load return port; and a control module to modulate the control pump and modulate the recirculation pump based at least in part on a measurement from the temperature sensor and the measurement from the second sensor.

In some embodiments of the system the second sensor is a liquid flow rate sensor and the property is the flow rate of liquid through the load return port. In some embodiments of the system the second sensor is a temperature sensor and the property is a temperature of liquid flowing through the load return port.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

The inventors have recognized and appreciated the need for lower cost, more efficient HVAC systems that provide improved control of indoor environments and have developed a new control system that may be used in an improved HVAC system to significantly reduce the capital and energy costs associated with the installation and operation of the HVAC system. The inventors have recognized and appreciated that, in terms of energy efficiencies and capital costs, there are three major problems with the conventional chilled water HVAC system. The first problem is the low delta T ($\Delta T$) which requires larger pipes and higher energy costs for pumping. The second problem is the high capital cost for the DOAS and its high fan energy costs created to overcome the pressure drops across the enthalpy wheel, desiccant wheel, cooling coil and reheat coil. The third problem is the energy penalties of having to reheat the air in the DOAS and FCU and the additional capital cost of having two coils in the FCUs. A new HVAC system is disclosed that overcomes these problems and provides other improvements over conventional systems.

Figure 1:
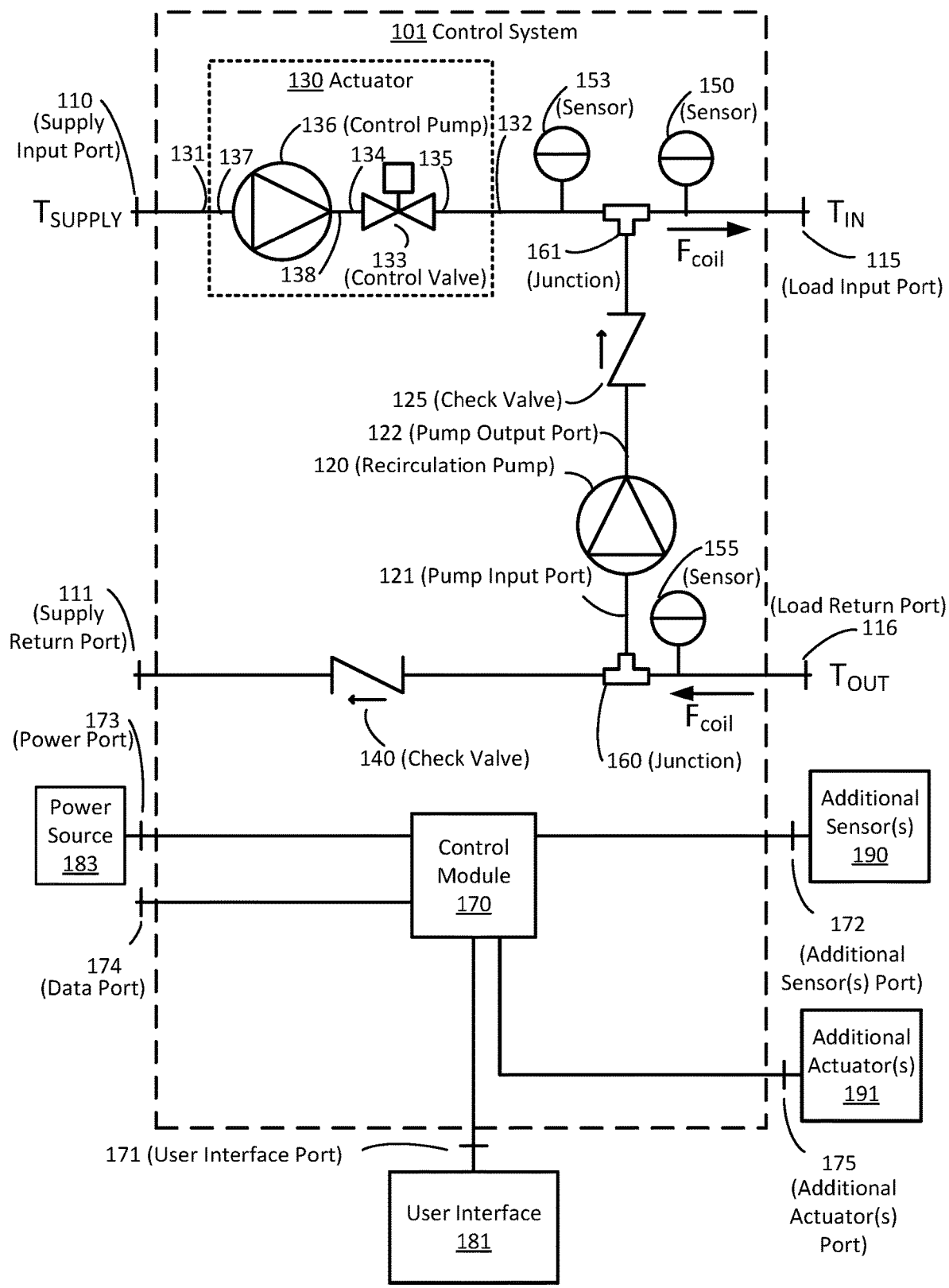
FIG. 1 is a block diagram of a control system, according to some embodiments.

FIG. 1 shows an embodiment of a single supply (two-pipe) control system, according to some embodiments. The features and concepts introduced with respect to the single supply control systems may also be applicable to the two-supply (four-pipe) control system shown in FIG. 2.

Referring now to FIG. 1, a control system 101 for controlling liquid flow from a supply into a conditioning unit is shown. The conditioning unit may be a fan coil unit (FCU), chilled beam, sensible cooling terminal unit (SCTU), other suitable unit for exchanging energy between liquid and air, other suitable units for exchanging energy between liquid and another medium, or any other suitable type of conditioning unit or combination of conditioning units. Control system 101 may also be connected to multiple conditioning units connected, for example, in series or in parallel, a combination of both or in any suitable way.

Control system 101 has a supply input port 110 and supply return port 111. When connected to a liquid supply system a relatively larger liquid pressure may be connected to input port 110 and a relatively lower liquid pressure connected to port 111. Liquid supply systems such as chillers and boilers are discussed further herein.

Control system 101 has load input port 115 and load return port 116. The input and return ports of the conditioning unit may be connected to ports 115 and 116, respectively. Note that load input port 115 is termed an input port in the sense that the liquid from this port is input to the conditioning unit and in normal operation liquid is expected to exit control system 101 through port 115. In some embodiments, ports 115 and 116 are connected to an inlet port and outlet port of a coil in the conditioning unit, respectively.

Ports 110, 111, 115, and 116 and all ports internal to control system 101 for handling liquid are of a type suitable for requirements of a particular embodiment of control system 101. Those of skill in the art appreciate that the appropriate materials for a port may depend on many factors such as the anticipated liquid pressure, the volume of liquid flow, and requirements of other components in the system. Ports may be of a type that allow for normal connecting and disconnecting (e.g., pipe connector, pipe fitting, hose clamps, couplings), or may be permanently attached such as by soldering, welding, or even continuous conduit. The latter may be practical, for example, in embodiments where control system 101 is assembled with the conditioning unit or liquid supply system. The choice of the type of port connection may consider factors such as where the connection will take place and how likely it is that the port needs to be disconnected in the future to support, for example, maintenance of the system.

Control system 101 has a recirculation pump 120. Pump 120 has a pump input port 121 and a pump output port 122. Pump 120 pumps liquid from pump input port 121 to pump output port 122. Pump input port 121 is connected to a first junction 160 and pump output port 122 is connected to second junction 161. Pump 120 may be a single (fixed) speed pump, or a multi- or variable-speed pump in some embodiments. In some embodiments, pump 120 may be sized to pump only a fraction of the flow rate associated with an attached conditioning unit since only a portion of the flow returning from the load is pumped by pump 120.

In some embodiments, pump 120 is a fixed-speed pump sized such that the flow rate of liquid through load input port 115 is within a target flow rate range or approximately a target flow rate for the conditioning unit over a range of positions for actuator 130. This target or target range for the flow rate may be specified by the conditioning unit's manufacture or determined by its construction.

In some embodiments, pump 120 is a variable-speed pump such that the flow rate of liquid through load input port 115 can be modulated in part by the speed at which pump 120 is run. As discussed further herein, modulating both the temperature of the liquid and the flow rate of liquid through the conditioning unit may be used to at least in part control the rates of latent and sensible cooling. In some embodiments, controlling both is essential if both humidity and temperature are to be controlled in a conditioned space served by the conditioning unit. In some embodiments, the rate of air flow over a coil to which ports 115 and 116 are connected may be modulated to control conditioning (e.g. by controlling the speed of a fan) and in some such embodiments only the flow rate or the temperature of the liquid is controlled.

The term "variable-" is used to encompass both actuators with "multi-" to describe a discrete set of operating points (three or more including the off/closed state) and actuators with essentially continuous variability are referred to as "continuously-variable-". Thus, for example, pumps and fans may be described as variable-speed, multi-speed, and continuously-variable-speed and dampers and valves may be described as variable-position, multi-position, and continuously-variable-position.

A first junction 160 splits liquid received from load return port 116; a first portion is directed to pump input port 121 for recirculation while a second portion is returned to the liquid supply system via supply return port 111. While junction 160 is illustrated by a T-type fitting in FIG. 1, it should be appreciated that any suitable device for splitting the liquid may be used.

A second junction 161 combines liquid received from supply input port 110 and pump output port 122 and provides the combined liquid to load input port 115. While junction 160 is illustrated by a T-type fitting in FIG. 1, it should be appreciated that any suitable device for combining the liquid may be used.

It is noted that in some embodiments junctions 160 and 161 are made from the same type of component (e.g., a T-type fitting) which may be able to provide both splitting of a liquid flow and combining a liquid flow. In some other embodiments, junctions 160 and 161 use different component types. The use of different component types for junctions 160 and 161 may be to provide better performance of the splitting and combining functions of the respective junctions. Second junction 161 may for example, include a mixer such as a static helical mixer that improves mixing of the combined flows (this may be beneficial in some embodiments to achieve an accurate temperature reading of the combined flow).

Control system 101 may include an actuator 130 for controlling flow of liquid between supply input port 110 and supply return port 111. Actuator 130 has a first port 131 and a second port 132. In control system 101, actuator 130 is connected between supply input port 110 and junction 161. Actuator 130 is said to be fully closed if liquid is prevented by actuator 130 from flowing between ports 131 and 132. Actuator 130 is said to be open if liquid is flowing between ports 131 and 132. In some embodiments, actuator 130 can influence the flow rate by assuming discrete intermediate states, while in some other embodiments actuator 130 can be controlled over a range. The term "fully closed" is used to refer to the state where the described component is in a state that minimizes (and for some components prevents) the flow of liquid through the component. The term "fully opened" is used to refer to the state where the described component is operated to maximize the flow of liquid through the component. A component with more than two operating states can, for example, be "opened more" to increase flow and "closed more" to decrease flow relative to a present state. When changing from the fully closed state, "opening" an actuator may mean opening to a partially or fully open state. A two state component is designed to be fully opened or fully closed. This language is used at times to describe actuator 130, and can be applied to, for example, valves and pumps, as specific examples of actuators. For example, if the actuator were simply a pump, fully closed would be an off state for the pump and fully open would be the "on" state for a fixed speed pump or the maximum speed of a variable speed pump.

In some embodiments, actuator 130 comprises a control valve 133 and a control pump 136. Control valve 133 has a first port 134 and a second port 135. Control pump 136 has an input port 137 and an output port 138. In some embodiments, control valve 133 and control pump 136 are connected in series between ports 131 and 132 of actuator 130. For example, in the illustrated embodiment shown in FIG. 1, the input port 137 is equivalent to port 131 of actuator 130, output port 138 is connected to first port 134 of control valve 133, and port 135 of control valve 133 is equivalent to port 132 of actuator 130. In some embodiments, the locations of control valve 133 and control pump 136 may be reversed. That is flow may be into control pump 136 before flowing into control valve 133 or flow may be into control valve 133 before flowing into control pump 136.

Control pump 136 may be a fixed-speed or variable-speed pump similar to recirculation pump 120. Though it should be appreciated that control pump 136 may be sized and selected based on different criteria than recirculation pump 120. For example, control pump 136 may be required to support a larger flow rate than that provided by recirculation pump 120 in some embodiments. The control module 170 may send a signal to control pump 136 to control the speed of control pump 136.

Control valve 133 may restrict flow of liquid between ports 131 and 132 of actuator 130. Control valve 133 may be a variable-position valve, adjustable from fully closed to fully opened through intermediate positions. If control valve 133 is fully closed, flow of liquid is prevented between ports 134 and 135. If control valve 133 is fully open, control valve 133 presents its minimum restriction to the flow of liquid. The intermediate positions provide intermediate levels of restriction to the flow of liquid between ports 134 and 135. In some embodiments control valve 133 can be controlled to discrete intermediate positions (e.g., in some embodiments utilizing digital control). In some embodiments, only two discrete positions are available, or utilized for control (e.g., control valve 133 is fully opened or control valve is 133 fully closed). Such a valve may be called a binary valve. In some other embodiments control valve 133 can be continuously controlled in intermediate positions between fully open and fully closed (e.g., in some embodiments utilizing analog control).

Control valve 133 and control pump 136 may work together to control (at least in part) the flow rate between supply input port 110 and supply output port 111. For example, if flow is not needed control valve 133 may be fully closed and control pump 136 turned off. When flow is called for, control valve 133 may be fully opened and control pump 136 run at a desired speed to establish desired flow properties. In some embodiments, control valve 133 permits binary control (fully open or fully closed) and except for the no flow condition, all flow control is managed by the speed of control pump 136. In some embodiments, both the speed of control pump 136 and the openness/closedness of control valve 133 are modulated to achieve a desired flow rate. For example, if the pressure from the supply system is very high, control valve 133 may be only partially open to permit actuator 130 to have greater control overall at low flow rates.

In some embodiments, actuator 130 consists of control pump 136 without a separate control valve 133. In some such embodiments, control pump 136 may be designed to prevent flow if the control pump is "off" thereby eliminating the need for an on/off control valve. In some embodiments the flow when the pump is off is sufficiently small to be acceptable.

In some embodiments check valves 125 and 140 are provided to prevent reverse flow in control system 101. Check valve 125 may be used to prevent backflow through recirculation pump 120; it may be located, for example, in the hydraulic conveyance between junctions 160 and 161.

Check valve 140 may be used to prevent back flow from supply return port 111 to supply input port 110. In the illustrated embodiment, check valve 140 is connected between supply return port 111 and first junction 160 and actuator 130 is connected between supply input port 110 and junction 161. In another embodiment, the location of check valve 140 and actuator 130 are switched. That is check valve 140 may be adjacent to supply input port 110 and actuator 130 may be adjacent to supply return port 111. Note that the direction of actuator 130 may need to be switched in such an embodiment (e.g., if actuator 130 includes a pump 136, to provide pumping in the correct direction). Though check valve 125 and actuator 130 may be located in any suitable location.

Control system 101 further comprises a sensor 150. Sensor 150 may be used to measure the temperature of liquid exiting control system 101 via load input port 115, $T_{IN}$. In the illustrated embodiment, sensor 150 is located inside the hydraulic conveyance between junction 161 and load input port 115, though sensor 150 may be positioned at any suitable location. In some embodiments sensor 150 is a temperature sensor that measures the liquid combined at second junction 161 and conveyed to load input port 115. In some embodiments a Pete's plug is used to allow a temperature sensor such as a thermistor or thermocouple to be inserted into the conduit. In some embodiments a T-shaped fitting may be used to accommodate a temperature sensor. In some embodiments sensor 150 includes a flow meter for measuring the flow rate of the liquid entering the load through load input port 115 ($F_{coil}$) and control module 170 controls actuator 130 and pump 120 to achieve a target load flow rate ($F_{coil\_target}$). The temperature of the liquid flowing out of load input port 115 may be measured in other ways.

In some embodiments, control system 101 also includes a sensor 153. Sensor 153 may be a temperature sensor located in the hydraulic conveyance to measure the temperature of liquid entering control system 101 via supply input port 110, $T_{SUPPLY}$. (Note, herein $T_{SUPPLY}$ is used to refer exclusively to the liquid supply temperature and the corresponding supply input port; it should not be confused with the temperature of air passing through supply air port 340 in FIG. 4.) In the illustrated embodiments, sensor 153 is located inside the hydraulic conveyance between supply input port 110 and junction 161. Though, sensor 153 may be located in any suitable location. In some embodiments, sensor 153 includes a flow rate sensor to measure the flow rate of the liquid supply ($F_{SUPPLY}$) in and out of ports 110 and 111.

In some embodiments, control system 101 also includes a sensor 155. Sensor 155 may be a temperature sensor located in the hydraulic conveyance to measure the temperature of liquid returning to control system 101 from the conditioning unit via load return port 116, $T_{OUT}$. In the illustrated embodiments, sensor 155 is located inside the hydraulic conveyance between load return port 116 and junction 160. Though, sensor 155 may be located in any suitable location.

In some embodiments, measurements obtained by sensor 150 of the temperature of liquid exiting control system 101 via load input port 115 and by sensor 155 of the temperature of liquid returning to control system 101 via load return port 116 are used to determine a temperature drop ($\Delta T = |T_{IN} - T_{OUT}|$) across the conditioning unit.

In some embodiments sensors 150 and/or 155 comprise a flow rate sensor to measure the flow rate, $F_{coil}$, of liquid through the conditioning unit connected to load input port 115 and load return port 116. In some embodiments, control system 101 is instrumented by sensors 150 and 153 to measure $T_{IN}$, $T_{OUT}$ and $F_{coil}$. These measurements provide sufficient information to estimate the total heating/cooling provided by an attached conditioning unit.

It should be appreciated that the illustration of sensors 150, 153, and 155 in FIG. 1 as temperature sensors is illustrative and each sensor may be any suitable type of sensor or combination of sensors.

Control system 101 may include power port 173 which may be connected to a power source 183. Power port 173 may receive electrical power needed to operate control system 101. While power port 173 is shown connected to control module 170, it should be appreciated that power may be provided to various other components of control system 101 directly or through control module 170. In some embodiments, power is provided for internally by control system 101. For example, control system 101 may be battery powered, include a generator, or use a suitable combination of battery storage, generators, and external power sources.

Control system 101 may include control module 170. Control module 170 may control actuator 130 and recirculation pump 120 based on various inputs such as from sensors 150 and 155, user interface 181 additional sensor 190, and remote commands received from data port 174. In some embodiments control module 170 includes data port 174 for communicating with other devices such as a control and monitoring center (e.g., a Building Management System, BMS), other control systems, and the like.

In some embodiments, control module 170 has a user interface port 171 for connecting to a user interface such as user interface 181. A user interface 181 may provide an interface for a user of the conditioned space to control control system 101. User interface 181 may allow a user to, among other things, indicate whether conditioning of the air in a conditioned space is desired, the type of conditioning (e.g., heating, cooling, drying), a setpoint temperature specifying a desired temperature in the conditioned space, a setpoint humidity specifying a desired amount of moisture in the air, a set point for a desired air quality, and to create a schedule for operation of control system 101. User interface 181 may also present information about the status of control system 101, the conditioned space, and the like to the user. In some embodiments, user interface 181 is a computer or other electronic device with any suitable combination of user interface devices such as a display, keypad, haptic feedback, speaker, microphone, touch screen, mouse, trackball, and other types of user interface devices. In some embodiments, user interface 181 may be accessible through a computer terminal as part of a building management system (BMS). For example, in a commercial use scenario the humidity and air quality requirements may be set by a building manager through the BMS while the room temperature may be set by a room occupant. In some embodiments a set point range is specified for one more or more of the control variables, thus defining an acceptable range of the controlled variable. For example, the humidity set point range may be defined as 35% to 55% relative humidity (RH). As another example, if the air quality metric is carbon dioxide, the set point range may be 0 to 800 ppm. The set point range is similar or equivalent to the concept of a dead band. By specifying a large set point range the system may be able to operate more efficiently than using a single set point. In some embodiments where only a single set point is used for a control variable a dead band may be used to improve operational performance. For air quality measures the set point value may be interpreted as "at or below" the set point value.

It is noted that "humidity" as used herein refers to a measure of an amount of water held in gaseous form (water vapor). Relative humidity and humidity ratio are two examples of measures of humidity that may be used.

Control module 170 may have an additional sensor port 172 for connecting additional sensors 190. Additional sensors 190 may measure the conditions in a conditioned space (e.g., indoor temperature and humidity), the temperature of air flows within the conditioning unit and other values that may be used to affect the operation of control system 101. For example, additional sensors 190 may include sensors for measuring the temperature (e.g., "room" or "air" temperature), the humidity, the relative humidity, the dew point temperature, the air quality (e.g., $CO_2$ level) or other conditions in a conditioned space.

Control module may have an additional actuator(s) port 175. Additional actuators port 175 may be connected to additional actuators such as fans, dampers, and other suitable types of actuators.

It should be appreciated that any suitable hydraulic conveyance may be used between the various hydraulic components of control system 101. If hydraulic conveyances are circular in cross-section, the internal diameter may be between 0.25 and 2.5 inches (e.g., about ½, ¾, 1, 1.5, 2 inch diameter, or any combination of ranges such between ½ in to 1 in.). For example, ½, ¾, 1, or 2 in. nominal pipe diameter may be used. Control system 101 may be designed such that the total length of its hydraulic conveyances is the least practical in view of considerations such as proper operation, the ease of repair. In some embodiments the total length of hydraulic conveyances is less than 25, 50, 75, 100, 250, or 500 equivalent internal diameters of the hydraulic conveyance. For example, an embodiment with ½ inch pipe may have a total length of hydraulic conveyances less than 25 inches.

Figure 2:
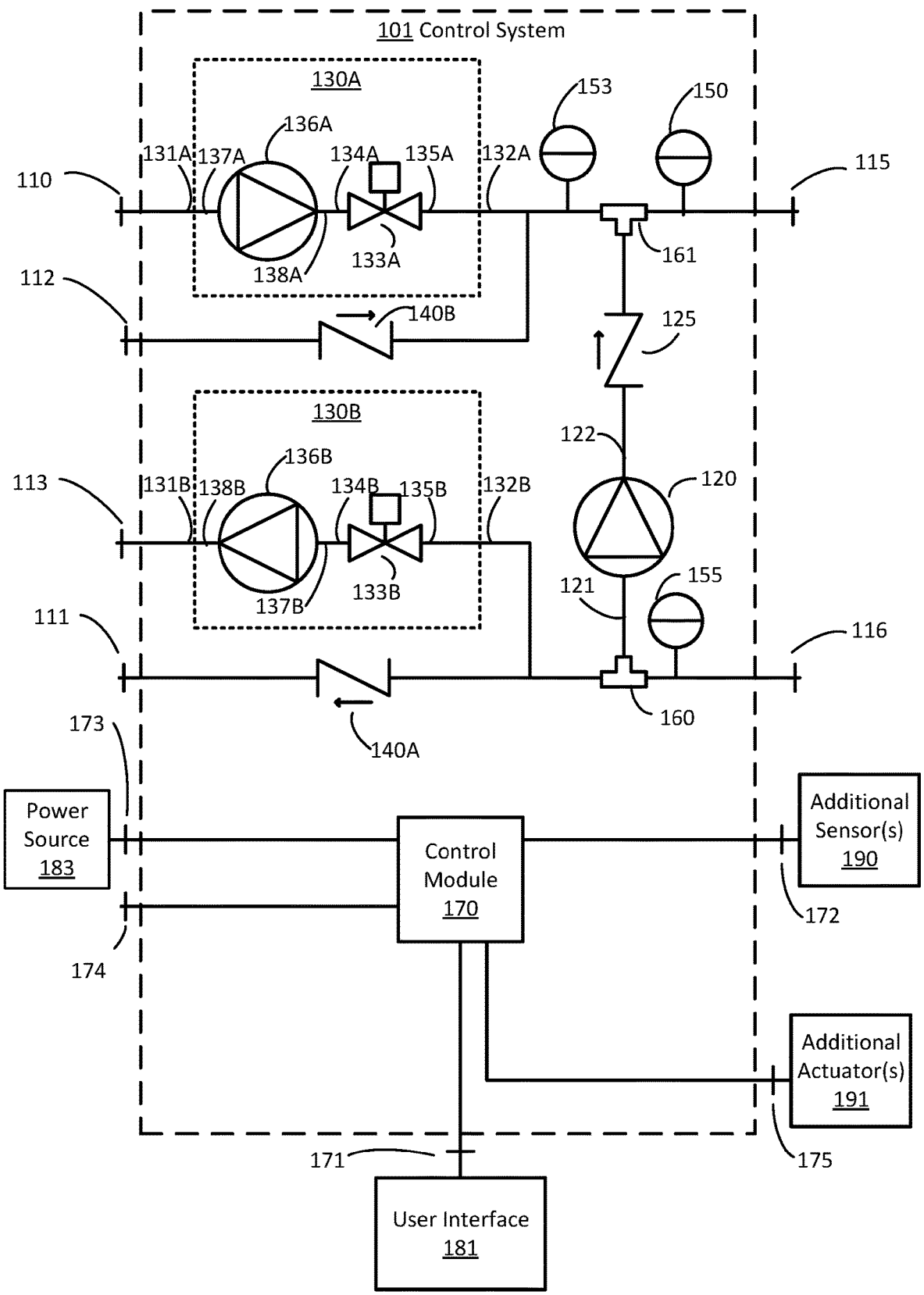
FIG. 2 is a block diagram of a control system, according to some embodiments.
Figure 3:
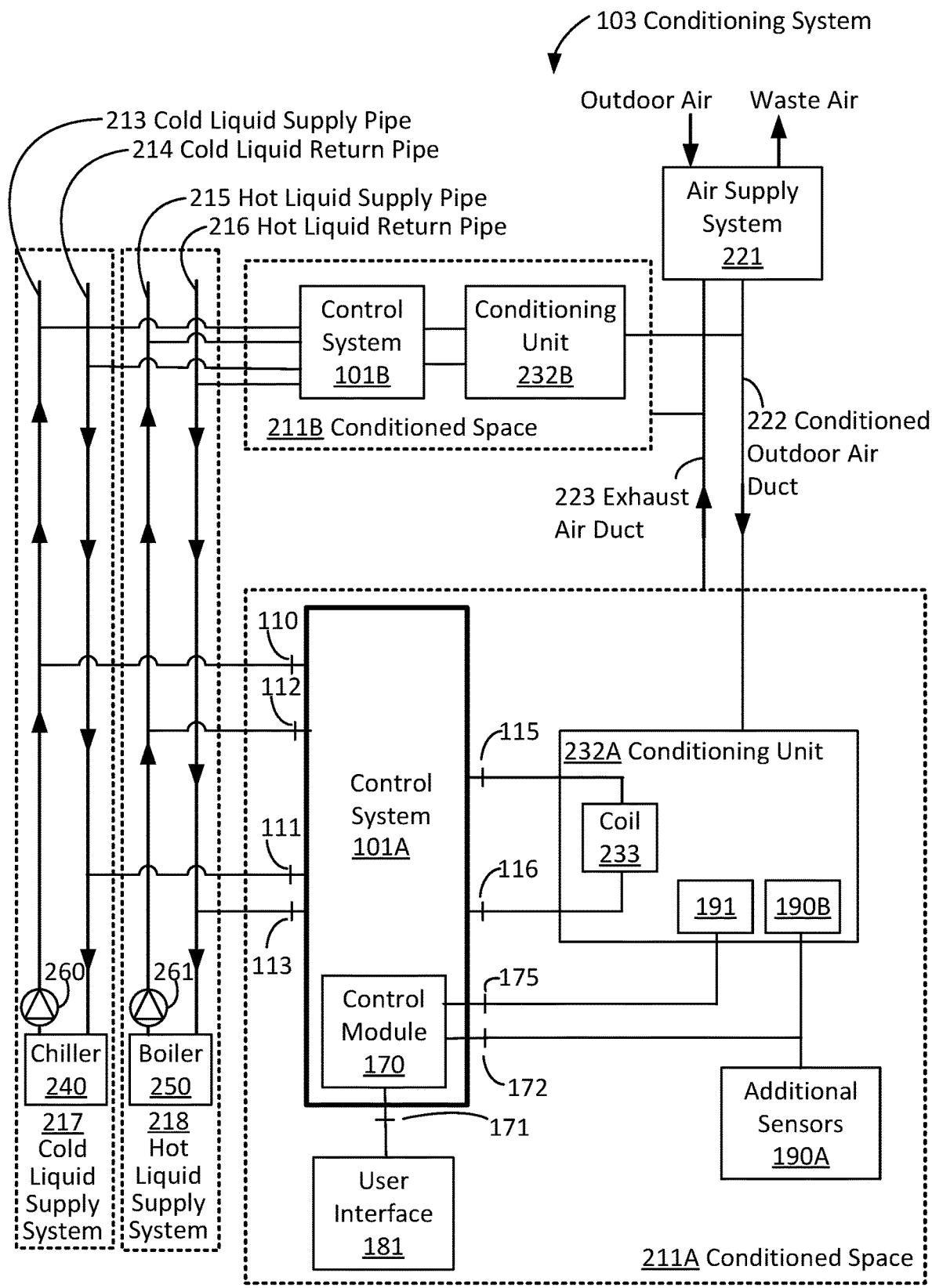
FIG. 3 is a block diagram of a conditioning system, according to some embodiments.

It should be appreciated that while FIG. 1 showed a single supply control system, other embodiments of the control system may be adapted to accommodate an arbitrary number of supplies. FIG. 2 shows another embodiment of control system 101 for a two supply (4-pipe) system. Such a control system may be connected, for example to a "hot" liquid supply and a "cold" liquid supply. Control system 101 has actuators 130A and 130B, and check valves 140A and 140B. In the illustrated embodiment, each actuator 130A/B has ports 131A/B and 132A/B, a pump 138A/B with input port 137A/B and output port 138A/B, and a control valve 133A/B having ports 134A/B and 135A/B. Notably, control system 101 includes an additional supply input port 112 and an additional supply return port 113 as compared to the embodiment described in connection with FIG. 1.

As an example, ports 110 and 111 may be connected to a cold liquid supply and ports 112 and 113 may be connected to a hot liquid supply (or vice versa). Actuator 130A may be off/closed during use of hot liquid and actuator 130B may be off/closed during use of cold liquid to avoid simultaneously drawing from both liquid supplies.

Some additional aspects of some embodiments of control system 101 are discussed with reference to FIG. 5. Control system 101 is shown as a two-supply control system, however, it should be clear however that the control module 170 can be used in or easily adapted for use in a single supply control system.

Control module 170 may receive input signals from sensor 150, additional sensors 190, user interface 182 and via data port 174. Control module 170 may be configured to send control signals via signal channels 411, 412, and 413 to actuator 130A, actuator 130B, and recirculation pump 120, respectively. Control module 170 may also send information such as the input signals, control signals, and status of control system 400 to other devices via data port 174.

Control module 170 may include a plurality of modules such as memory 401, processor 402, power supply 403, communications module 404, and input/output (I/O) modules 405.

Processor 402 may be configured to implement control algorithms in response to input signals received by control module 170. Processor 402 may be operatively connected to memory 401 and other modules of control module 170. Processor 402 may be any suitable processing device such as for example and not limitation, a central processing unit (CPU), digital signal processor (DSP), field programmable gate array (FPGA), application specific integrated circuit (ASIC), or any suitable processing device. In some embodiments, processor 402 comprises one or more processors, for example, processor 402 may have multiple cores and/or multiple microchips.

Memory 401 may be integrated into processor 402 and/or may include "off-chip" memory that may be accessible to processor 402, for example, via a memory bus (not shown). In some embodiments, memory 401 stores software modules that when executed by processor 402 perform desired functions; in some embodiments memory 401 stores an FPGA configuration file for configuring processor 402. Memory 401 may be any suitable type of non-transient, computer-readable storage medium such as, for example and not limitation, RAM, ROM, EEPROM, PROM, volatile and non-volatile memory devices, flash memories, or other tangible, non-transient computer storage medium.

Power supply 403 provides the power signals for the operation of control module 170 and other electrical devices in control system 400. Power supply 403 may use power source 183 to facilitate generation of such power signals, though other sources of power may be used. For example, power source 183 may provide a 120V AC power signal to control system 400. Power supply 403 may convert the provided AC signal into DC voltage signals suitable for operation of various components of control system 400—control module 170 may require 3.3V and/or 5V, control valves 130 and 133 may require 24V, and recirculation pump may require 12V. Thus, power supply 403 may convert the 120V AC power signal into these various DC voltage signals, or any other signals based on the requirements of a particular embodiment.

Communications module 404 may be any suitable combination of hardware and software configured to generate and receive communication signals over data port 174. Data port 174 may include a wired data port, a wireless data port, or both. Data port 174 may provide a connection to a network such as a LAN, WAN, the internet, and/or another device using any suitable communications protocol. Communications module 404 may be configured to communicate with other control systems, a centralized control and monitoring center, or any other device. For example, multiple control systems may be connected together and to a control and monitoring center to facilitate data logging, reconfiguration of the connected control systems and the like. In some embodiments, multiple control systems are daisy chained together; to facilitate this port 174 may include two or more physical connectors to allow each control system to be connected by cable into the next. Other suitable network topologies may also be used.

I/O 405 may include digital I/O 406, relay 407, analog-to-digital converter 408 (ADC 408), digital-to-analog converter/pulse width modulator 409 (DAC/PWM 409), and amplifier 410. I/O 405 permits signaling with other devices and sensors connected to control module 170. I/O 405 is not limited to these types of input and output, and the discussion of the use of I/O 405 is exemplary and other input/output mechanisms may be used in other embodiments.

Digital I/O 406 allows for digital signaling of input and/or output signals. For example, sensor 150, ambient sensor 182, or user interface 181 may utilize digital communication protocols that utilize digital I/O 406.

Relay 407 may be used to facilitate the use of a low voltage digital I/O (e.g., 3.3V, 5V) to control a higher voltage signal. For example, recirculation pump 120 may require a 12V power signal drawing 1 Amp of current to run the pump. A digital I/O pin may only be able to provide, say, a 5V signal with a 15 mA maximum current. The use of a properly configured relay 407 can allow such a digital I/O pin to control a much higher voltage and current power signal to pump 120.

ADC 408 allows an analog signal to be processed digitally by converting such signals into a sequence of digital bits. For example, sensor 150 may be a thermistor which has a resistance that varies predictably with temperature. A suitable circuit (e.g., voltage divider) and ADC 408 may be used to convert a voltage measurement into a digital signal. The digital signal may then be processed by processor 402 (or otherwise) to determine the temperature from the thermistor. As another example, sensor 150 may be a thermocouple whose voltage may be converted to a digital signal directly by ADC 408 or after a suitable signal conditioning circuit (e.g., amplification, low pass filtering).

DAC/PWM 409 represent two forms of outputting an analog voltage signal. Digital-to-analog converters may convert digital inputs into analog outputs with discrete increments (though such increments may be below the noise floor in some cases). Pulse width modulation (PWM) may simulate an analog voltage level by switching between digital values at high frequency. The time average voltage value is controlled by varying the duty cycle. Low pass filtering can be used to remove the high frequency switching content leaving the time average voltage signal level. DACs or PWMs may for example, be used to provide an analog output signal for controlling the actuators 130A and 130B.

Amplifier 410 may increase the voltage or current of a low power signal, such as a signal output by digital I/O 406 or DAC/PWM 409. For example, actuator 130A may require an analog voltage input between 2 and 10 volts to vary the amount of liquid in flow 491A. A PWM signal may be generated by a 3.3V digital device (logic 0 at 0 V, logic 1 at 3.3V)—thus the time average voltage of the PWM signal can only be between 0 and 3.3 volts. Thus, to use the PWM signal to actuator 130A, amplifier 410 may be configured to multiply the input voltage by a little over 3 and the resultant signal used for control.

Control module 170 may send or receive signals to sensors and actuators associated with control system 101 as well as provide electrical power to such devices. Though, in some embodiments power may be provided directly by power source 183 or another source. Signal channels 411, 412, 413, 414 and 415 may facilitate signaling with actuator 130A, actuator 130B, recirculation pump 120, sensor 150, and sensor 155, respectively. Other signal channels may facilitate communication with other sensors and actuators (not shown). In some embodiments, signal channels 411-415 may also provide power to the respective sensors and actuators. In some cases, the control signal and power may be the same signal. For example, the control signal may simply be providing the power needed to run a pump at the desired speed. Signal channels 411-415 may be wired or wireless signal channels, or any suitable type of signal channel.

Figure 5:
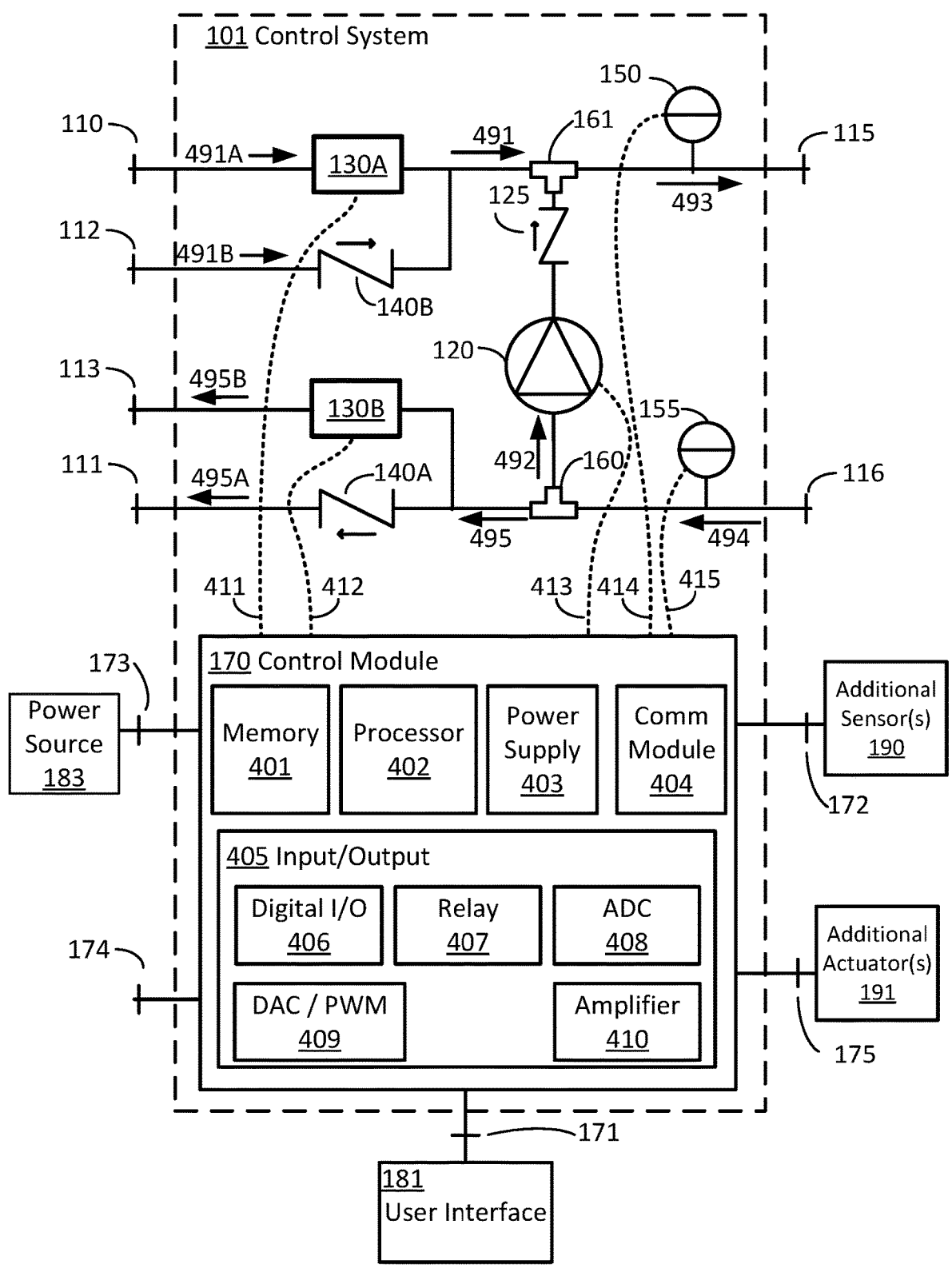
FIG. 5 is a block diagram of a control system, according to some embodiments.

FIG. 5 also shows the flow of liquid within control system 101. The flows include (i) supply input flow 491, (ii) recirculation flow 492, (iii) load input flow 493, (iv) load return flow 494, and (v) supply return flow 495. The positive flow direction may be taken as the direction of the indicating arrow. First supply input flow 491A and second supply input flow 491B combine to form supply input flow 491. Supply return flow 195 is divided into first supply return flow 195A and second supply return flow 195B.

In some embodiments, only one of first supply input flow 491A and second supply input flow 491B has a non-zero flow rate at any given time. Similarly, only one of first supply return flow 495A and second supply return flow 495B has a non-zero flow rate at any given time. These conditions may be achieved by ensuring that at any time at least one of the actuators (130A or 130B) is fully closed. Assuming no loss of liquid in the load (i.e., $F_{493}=F_{494}$), the return flow rates will equal the input flow rates of the respective supply ($F_{491A}=F_{495A}$; $F_{491B}=F_{495B}$). Accordingly, where the assumption that $F_{493}=F_{494}$ a flow rate sensor located between junction 161 and port 115 can measure both load input flow 493 and load return flow 494. Similarly, a flow rate sensor located between junction 160 and port 116 can also measure both load input flow 493 and load return flow 494.

Having discussed embodiments of a control system with reference to FIGS. 1, 2, and 5 attention is now turned to FIG.

3 which shows a conditioning system 103 utilizing the control system 101 shown in FIG. 2. Specifically, FIG. 2 shows two control systems, namely control systems 101A and 101B. Conditioning system 103 includes cold liquid supply system 217 and hot liquid supply system 218. Though, it should be appreciated that conditioning system 105 could be adapted to a single liquid supply system or any suitable number of supplies.

Conditioning system 103 is a system for conditioning one or more conditioned spaces such as conditioned spaces 211A and 211B. Conditioned spaces 211A and 211B are each a volume where one or more environmental parameters such as temperature and humidity are to be controlled by conditioning system 103. Examples of volumes that may be suited for conditioning include but are not limited to the rooms of a house, condo, hotel, or office; retail space; or office buildings; commercial real estate, industrial buildings; factories; hangers; boats, aircraft, vehicles, and other indoor environments. In some embodiments, conditioning system 103 is a system for controlling heating, cooling, humidity, ventilation, and/or other properties in such an indoor environment.

Conditioning system 103 may have one or more liquid supply systems such as cold liquid supply system 217 and hot liquid supply system 218. A liquid conditioner of the liquid supply system conditions liquid to have desired characteristics such as, for example, a particular temperature or to be within a specific temperature range. Chiller 240 and boiler 250 are examples of a liquid conditioner. A pump may be used to pump the conditioned liquid through the liquid supply system. The liquid may be water, water with additives to improve performance (e.g., glycol to reduce the risk of freezing), or any other suitable liquid.

Cold liquid supply system 217 includes a chiller 240 for cooling the liquid. A pump 260 for pumping the liquid to the devices along cold-liquid supply pipe 213 (e.g., to control systems 101A/B). The cold liquid returns to chiller 240 along cold-liquid return pipe 214. Cold liquid supply system 217 may utilize chiller 240 to cool the liquid, for example, to a temperature above the freezing point for the liquid. The temperature may be a fixed value (e.g., 32, 33, 34, 35, 66, 37, 38, 39, 40, 41, 42, 43, 44, 45, 50, 55, 58 F) to within a tolerance (e.g., degree or two or a fraction of a degree) though requirements may differ with different embodiments. Similarly, a hot supply system may utilize a boiler, heat pump or other device to heat a liquid, for example, to a temperature between about 100 and 180 F. The temperature may be a fixed value (e.g., 110, 120, 130, 140, 150, 160, 170, 180 F) to within a tolerance (e.g., a few degrees) though requirements may differ with different embodiments. Similarly, hot liquid supply system 218 includes a boiler 250 for heating liquid and a pump 261 for pumping the liquid to the devices along hot liquid supply pipe 215 (e.g., to control systems 101A/B). The hot liquid returns along hot liquid return pipe 216. Although only control systems 101A and 101B are shown connected to supply systems 217 and 218 it should be appreciated that any number of devices may be connected to such liquid supply systems. In some embodiments, the temperature of liquid from a supply source connected to control system 101 is not known or tightly controlled by the control system and control system 101 dynamically adapts to changing supply conditions. In some embodiments, 10s, 100s, or even 1,000s of additional devices may be connected, however, in some embodiments of conditioning systems 103, only a single control system may be connected to the liquid supply system(s).

The liquid supply systems are connected to the control systems 101A/B. For example, cold liquid supply pipe 213 may be connected to supply input port 110, cold liquid return pipe 214 may be connected to supply return port 111. Similarly, hot liquid supply pipe 215 may be connected to supply input port 112, hot liquid return pipe 216 may be connected to supply return port 113.

The control system 101A/B are connected to respective conditioning units 232A/B. Conditioning unit 232A is located at/in conditioned space 211A. Conditioning unit 232A may be a chilled beam, fan coil unit (FCU), another device for heat transfer within conditioned space 211A, or any other suitable device or combination of devices. In some embodiments, conditioning unit 232A is a two-port device with an input which receives liquid; the liquid flows through piping within conditioning unit 232A allowing energy transfer with conditioned space 211A and exits via a return port. The piping may be in the form of a coil 233 to increase the amount of energy transfer that takes place prior to returning the liquid flow. Control system 101A is connected to conditioning unit 232A by load input port 115 and load return port 116. In the illustrated embodiments, the load input port 115 and load return port 116 of control system 101A are illustrated as connected to a coil 233. Sometimes coil 233 is referred to as a cooling coil or heating coil. It should be appreciated that since cooling and heating may be performed using the same coil the cooling or heating adjective is merely intended to emphasize the operating mode being discussed. Control system 101A may be designed to match the requirements of conditioning unit 232A. For example, conditioning unit 232A may be a FCU designed to receive about 1 to 2 gallons per minute of liquid. The pipes, pump, and ports of control system 101A may be selected for the efficient operation of a specific conditioning unit. Conditioning unit 232B may be any suitable conditioning unit and may be of similar description to conditioning unit 232A.

While control system 101A is shown connected to a single conditioning unit 232A, it should be appreciated that conditioning unit 232A may include multiple units. These units may be connected in parallel, serial or in any suitable way. For example, a large conditioned space 211A may require multiple FCUs to condition the air, though a single control system 101A may be used for the multiple FCUs. Further, in some embodiments, multiple control systems are utilized in a single conditioned space.

Figure 4:
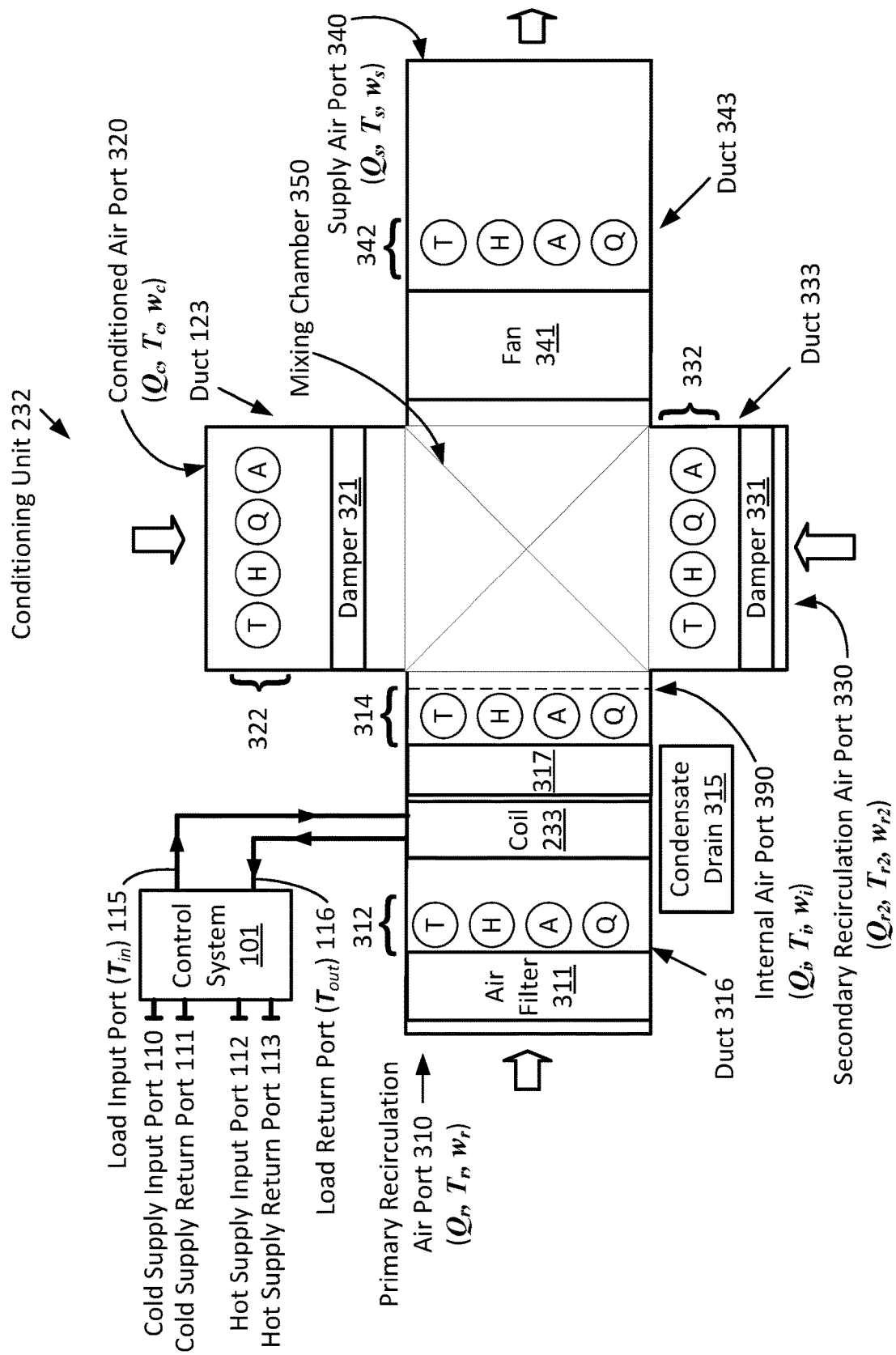
FIG. 4 is a block diagram of a control system and conditioning unit, according to some embodiments.

Control module 170 may be connected to additional sensors 190A and 190B to sense properties in conditioned space 211A and conditioning unit 232A, respectively. For example, sensors 190A may include, for example, temperature and humidity sensors for measuring the room temperature ($T_{room}$) and humidity ($H_{room}$) conditions of the air in conditioned space 211A (e.g., "room air"). Humidity may be represented, for example, as humidity ratio, relative humidity or another suitable representation of humidity. Sensors 190B may include, for example, temperature, humidity, air quality, and air flow sensors to measure properties within conditioning unit 232A. With reference to FIG. 4, sensors 190B may include, for example, sensor suites 312, 314, 322, 332, and 342. The '972 application and '031 application provide additional examples of how a conditioning unit may be instrumented with sensors.

Control module 170 may also be connected to additional actuators 191. Additionally actuators 191 may include, for example, fans and dampers that may be positioned in conditioning unit 232A to control air flows within the conditioning unit. The '972 application and '031 application provide additional examples of how a conditioning unit may be equipped with actuators that may be controlled by control system 101A.

In some embodiments, conditioning units 232A and 232B are connected to an air supply system 221. Air supply system 221 may be a dedicated outdoor air system (DOAS) and may feature an energy recovery ventilator (ERV). Though other embodiments are possible. Air supply system 221 has a conditioned outdoor air duct 222 that provides conditioned outdoor air to conditioned spaces 211A/B. In some embodiments, the conditioned outdoor air duct 222 is directly connected to conditioning units 232A/B. Air supply system 221 receives exhaust air via exhaust air duct 223. The exhaust air duct 223 may receive exhaust air from each of the conditioned spaces 211A/B. Air supply system 221 takes in outdoor air and exhausts the exhaust air to the outdoor environment ("waste air"). Air supply system 221 may include elements to exchange heat and moisture between the outside air and the exhaust air from the conditioned spaces. In winter conditions, cold, dry air may be warmed and humidified by the exhaust air returning front the conditioned spaces, while in summer conditions warm air may be cooled by the exhaust air (and possibly dried or humidified depending on the conditions).

Extensive simulations have been performed operating this system in a variety of climates to show significant energy savings relative to conventional systems and the ability to meet reasonable setpoints throughout the year.

One significant advantages over conventional systems is that the cold liquid supply can be operated at a much colder temperature than traditional systems are operated at (e.g., 38 F rather than 45 F). This results in the need for less liquid to be pumped throughout the conditioning system 103 and pump 260 and pipes 213 and 214 can be smaller (i.e., smaller pumping volume, smaller pipe diameter) resulting in both cost and energy savings.

Another significant advantage over conventional systems is that conditioning unit 232 can deliver more latent cooling than conventional systems due to the lower cold liquid supply temperature. Thus less latent cooling of outdoor air needs to be performed by air supply system 221 which will significantly reduce the energy consumption and capital costs of air supply system 221. Our analysis has shown that an ERV will provide sufficient outdoor air conditioning eliminating the need for an DOAS unit.

FIG. 4 provides a detailed view of a conditioning unit 232 according to some embodiments. Conditioning unit 232 may have four air ports connected to a mixing chamber 350. A primary recirculation air port 310 draws air from the conditioned space. A conditioned air port 320 is connected to a duct providing conditioned outdoor air. In some embodiments, a secondary recirculation air port 330 draws in additional air from the conditioned space. A supply air port 340 delivers the air drawn from the other three ports to the conditioned space.

Each port may have an air duct which delivers air to a mixing chamber 350. As shown, port 310 has duct 316, port 320 has duct 123, port 330 has duct 333, and port 340 has duct 343.

Duct 316 associated with the primary recirculation port 310 may have an air filter 311, cooling coil 233 and damper 317. Air filter 311 removes dust and other particulates before the recirculation air is passed over cooling coil 233. Coil 233 receives liquid from control system load input port 115 at a temperature $T_{IN}$ and returns the liquid to control system 101 via load return port 116 at a temperature $T_{OUT}$. $T_{IN}$ and $T_{OUT}$ may be measured, for example, by sensors 150 and 155 shown in FIG. 1. In some embodiments, control system 101 has four supply side ports as shown. This may be set up to support both cold liquid (via ports 110 and 111) and hot liquid (via ports 112 and 113). In some embodiments, control system 101 may only have two supply side ports for input and return of liquid. Control system 101 may house various sensors (e.g., temperature, humidity) and actuators (e.g., pumps, valves) that may be sensed and controlled by control system 101 to achieve the desired input water properties. In some embodiments, one or more of the temperature(s) of the liquid entering the coiling coil ($T_{IN}$), the temperature of the liquid exiting the coiling coil ($T_{OUT}$), the different between the two ($\Delta T = T_{IN} - T_{OUT}$), and the flow rate of the liquid through the cooling coil is/are controlled by control system 101.

Coil 233 may have a condensate drain 315 that drains off condensation accumulated on coil 113. Though, in some embodiments such as a chilled beam configuration, conditioning unit 232 may be operated to prevent condensation on the cooling coil such that condensate drain 115 is unnecessary. (Note that air filter 311 may be unnecessary if coil 233 is non-condensing.) Damper 317 may be used to control the amount of air flowing through port 310. Damper 317 may be fully closed, for example, when the required conditioned air is suitable and sufficient to provide the desired heating and cooling for the conditioned space. In some embodiments, if fan 341 is a fixed speed fan and cannot itself be modulated, damper 317 may be modulated to change the air flow rate through the coil 233.

Air is drawn through port 310, and then through air filter 311 and coil 223, by fan 341 located in duct 343. Fan 341 may be a variable speed fan, such as an electronically commutated motor (ECM) fan, a fixed speed fan, or any suitable type of fan. In some embodiments, fan 341 is positioned in another suitable position within conditioning unit 232. For example, fan 341 may be positioned in duct 316 before or after coil 233.

The speed of fan 341 may be modulated to change the rates of sensible and latent cooling provided by coil 233. For example, by decreasing the fan speed the sensible heat ratio (defined below) may be decreased, thereby increasing the amount of latent cooling relative to the amount of sensible cooling.

The conditioned outdoor air required for the conditioned space is provided through conditioned air port 320. A damper 321 in duct 322 may be used to control the amount of conditioned outdoor air. The amount of outdoor air may be controlled to maintain the carbon dioxide, volatile organic compounds (VOCs), infectious aerosols, or other measures of air quality at or below prescribed levels. For example, an air quality sensor in one of the sensor suites (e.g., sensor suite 342) may be used as the basis of control. If the air quality is below threshold, damper 321 is opened more, and if air quality is above threshold, damper 321 may be closed more. A suitable controller may be used (e.g., PID). In some embodiments, damper 321 is modulated to maintain a minimum flow rate of conditioned air through conditioned air port 320. In some embodiments, damper 321 is used to bring in conditioned air to increase the temperature of the mixed air to above a minimum threshold before exiting via supply air port 340. This requirement may be in addition to the air quality requirement such that damper 321 is operated to meet both the air quality requirement and additionally insure the temperature of air exiting supply air port 340 is sufficiently high. The use of excess conditioned air (beyond what is needed for air quality) may be necessary, for example, in an embodiment that does not have secondary recirculation air port 330, if damper 331 is not operating properly (e.g., stuck), or if even with damper 331 fully open the air exiting supply air port 340 would otherwise be too cool. Of course, bringing in excess conditioned air assumes this air is warm enough to warm the air off the coil. It also assumes that the humidity of the conditioned air is low enough to justify bringing the additional moisture into the room. Accordingly, care is needed to make sure that if conditioned outdoor air is being brought in for warming, it does not introduce so much additional humidity that the coil must be run colder creating a positive feedback loop.

In some usage scenarios, mixing the air coming off of cooling coil 233 and the conditioned air alone would result in a supply air temperature exiting port 340 below a desired temperature. Such a desired temperature may be defined to ensure that the supply air is not uncomfortably or unreasonably cold. Additional recirculation air drawn from the secondary recirculation air port 330 may be used to raise the temperature of such air such that the minimum temperature requirement for the supply air is met.

In some embodiments a damper 331 in duct 333 controls the amount of secondary recirculation air. Some other embodiments do not utilize a damper 331 and always permit a sufficient amount of secondary recirculation air such that the supply air minimum temperature requirement is not violated. One advantage of utilizing a damper is that it may reduce the amount of fan energy required to condition the room under certain circumstances. More specifically, by closing damper 331 when secondary recirculation air is not needed, less energy may be used by fan 341.

In some embodiments, damper 331 is controlled by control system 101 to maintain the supply air temperature above a minimum temperature during cooling operation. For example, since supply air blows into the conditioned space, occupants of the conditioned space may find air below a particular temperature undesirably cool (e.g., below 55 F). Coil 233 may cool the air below such temperature in order to provide adequate latent cooling. By adding room air into the mixing chamber 350 via secondary recirculation air port 330 the existing air may be warmed. It is noted that conditioned air entering mixing chamber 350 may also warm the air, however, the amount of conditioned air is likely determined by other considerations such as maintaining the air quality in the room. Since conditioned outdoor air is relatively expensive, it may be preferable to utilize secondary recirculation air rather than excessive conditioned outdoor air to increase the temperature of air before exiting conditioning unit 232 via supply air port 340. The damper 331 may thus be modulated by control system 101 to keep the supply air above a minimum temperature. In some embodiments, control system 101 modulates damper 331 with a goal of minimizing the amount of supply air utilized to save fan energy. Though in some embodiments secondary recirculation air port 330 does not have a damper and is simply left open at all times. Still in some other embodiments, conditioning unit 232 does not have a secondary recirculation air port 331 and utilizes a heater in duct 343 to warm supply air to a minimum temperature before it exits the conditioning unit into the room (a three port embodiment). Such a three port embodiment of conditioning unit 232 is equivalent to requiring damper 331 to be fully closed at all times. Yet in still other embodiments, conditioning unit 232 has both a secondary recirculation air port 331 and a heater in duct 343 to warm supply air to a minimum temperature before it exits the conditioning unit into the room. The heater may be used in conditions where adequate warming of the supply air is not achieved even with damper 331 fully open.

Damper 317, damper 321, damper 331, and fan 341 may be controlled by control system 101. More specifically, these actuators may be connected to control module 170 of control system 101 via additional actuator port 175, shown for example, in FIGS. 1 and 2. Control system 101 may operate to condition the conditioned space to meet one or more target conditions such as air temperature, air humidity, and air quality. In some embodiments, one or more of the set points may be set by a user through user interface 181 (FIGS. 1 and 2).

Conditioning unit 232 may be instrumented with sensor suites 312, 314, 322, 332, and 342. Each sensor suite may include sensors such as a temperature sensor ("T"), a humidity sensor ("H"), an air quality sensor ("A"), and an air flow rate sensor ("Q"). Though, these sensors are exemplary, and each sensor suite may include any suitable sensor or combination of sensors. The location of sensor suites 312, 314, 322, 332, and 342 are exemplary, and other suitable positions may be used. Also, not all sensor suites may be present in all embodiments, and other sensor suites may be present in some embodiments. For example, as cooling coil 233 may not be expected to affect the air flow rate or the air quality, such sensors may not be needed on both sides of cooling coil 233 within duct 316.

Control system 101 may be used to control the temperature, humidity, and air quality in the conditioned space. The term "air quality" is used to refer to one or more measures of air quality such as the amount of carbon dioxide, VOCs, infectious aerosols, and other components in the air that may reduce its quality for human or other purposes.

In some embodiments, air quality is controlled by feedback control of damper 321 based on an air quality sensor measurement. For example, a carbon dioxide sensor located in the conditioned space (e.g., near a wall mounted user interface) or in sensor suite 312, 314, and/or 332 may be used to measure the amount of carbon dioxide in the room/recirculation air. Damper 321 may be controlled using a PID (proportional-integral-differential) controller or other suitable controller to maintain the carbon dioxide level in the room at or below the set point (e.g., 800 ppm). This operation works because the conditioned air, which is sourced from air outside the building, is expected to have acceptable air quality (i.e., air with a $CO_2$ concentration lower than 800 ppm in the example). In some embodiments, a minimum amount of outdoor air may be required at all times, thus requiring damper 321 to be at least slightly opened (and not fully closed) at all times during normal operation.

The temperature and humidity in the conditioned space may be controlled with the goal of achieving the specified set points, or set point range, for the conditioned space. Control system 101 may control the amount of sensible cooling/heating and latent cooling by controlling fan 341, properties of the liquid flowing through cooling coil 313 (e.g., temperature and flow rate), and dampers 317, 331, and 321. Though, not all such control actuators may be present or used in all embodiments, and suitable alternatives may be used in some embodiments. For example, damper 321 may be used exclusively to meet outdoor air/air quality requirements and, while its position affects the supply air temperature and humidity, its position is simply an input to the control of temperature and humidity of the conditioned space.

Having introduced some embodiments of the control system and the conditioning systems in which it may be used, attention is now turned to the control algorithms implemented, for example, by the control module of control system 101.

Control system 101 may be operated to control the temperature, humidity, and air quality in a conditioned space. Temperature control may be achieved by controlling the amount of sensible cooling ($h_s$) delivered to the conditioned space. Air quality may be controlled by controlling the amount of conditioned outdoor air delivered to the conditioned space. In cooling, humidity can be controlled (lowered) by control system 101 by providing latent cooling ($h_l$) of the air. If conditioned outdoor air has higher than target humidity, humidity will also be increased by bringing in conditioned outdoor air. Unless the air is reheated, latent cooling can not be provided without simultaneously delivering sensible cooling. Since reheat is to be avoided in some embodiments as energy inefficient, both temperature and humidity cannot be fully controlled independently. However, by intelligently operating the conditioning system, practical temperature and humidity targets for human occupied conditioned spaces can be met under the vast majority of practical operating conditions.

Figure 6A:
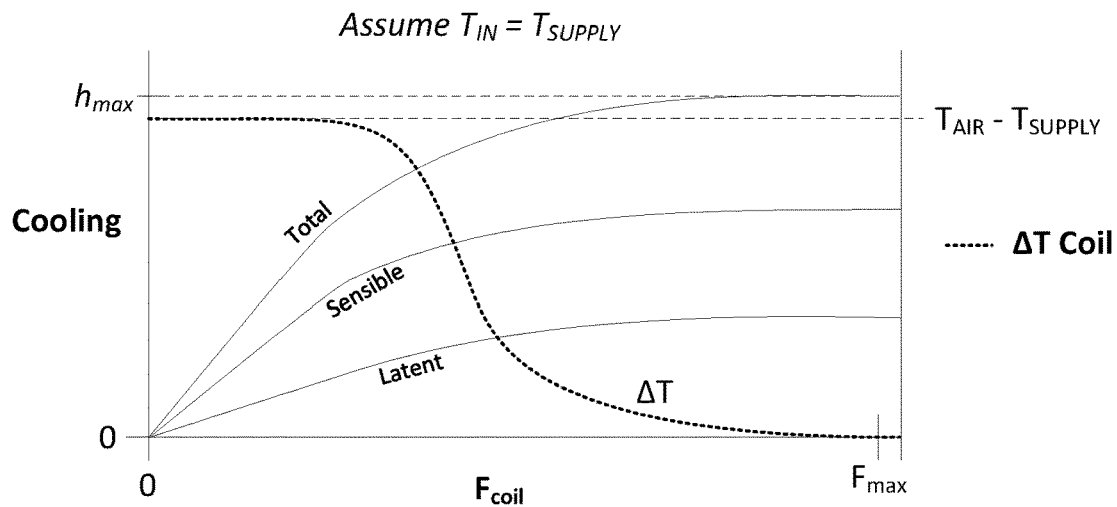
FIGS. 6A-6C is a set of plots showing a qualitative relationship between the rate of cooling, change in liquid temperature across the coil ($\Delta T$), and flow rate through the coil; according to some embodiments.
Figure 6B:
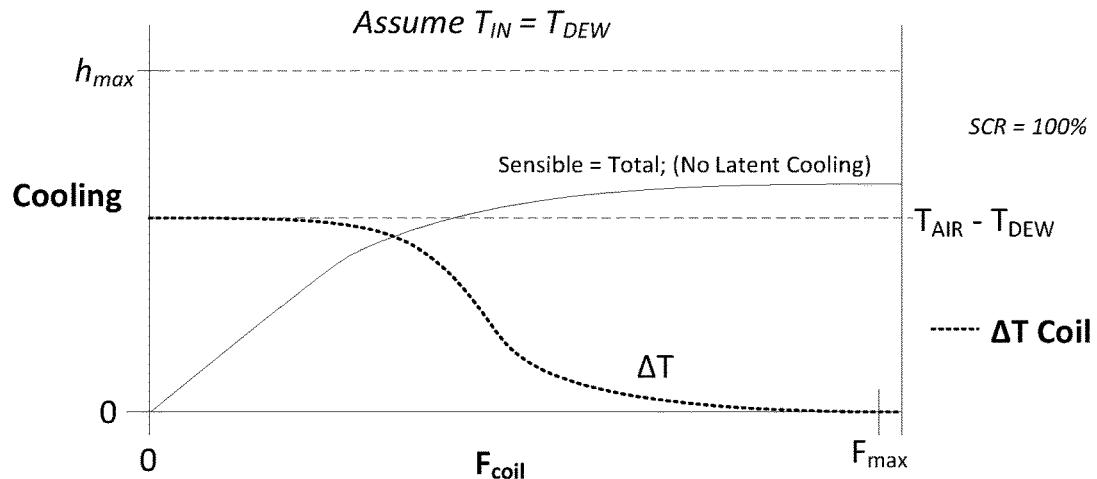
Figure 6C:
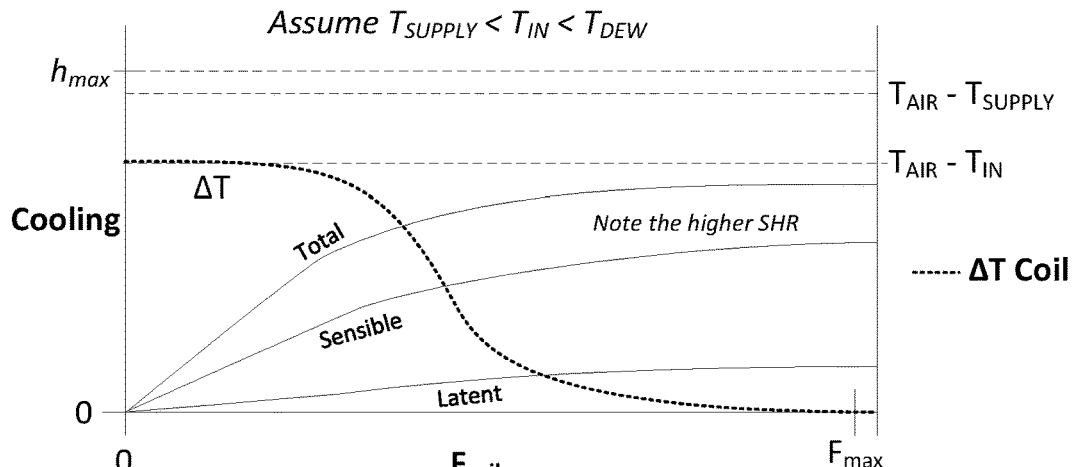

Attention is now directed to FIGS. 6A-6C which shows a set of qualitative plots illustrating qualitatively a relationship between total cooling, h ($h=h_s+h_l$), liquid flow rate through the coil, $F_{coil}$, and $\Delta T$. These plots are qualitative and illustrate how a target input temperature ($T_{IN}$) and flow rate ($F_{coil}$) may be found based on a desired amount of sensible cooling and latent cooling, or equivalently based on the desired total cooling and sensible heating ratio (SHR). The sensible heating ratio (SHR) is defined as $h_s/h$. For a cooling coil, SHR is minimum (maximum amount of latent cooling) when $T_{IN}$ is minimum ($T_{IN}=T_{SUPPLY}$) and 100% when $T_{IN}$ is equal to or greater than the dewpoint temperature.

It should be noted that in addition to being dependent on $T_{IN}$, the plots are also dependent on the conditions in the conditioned space. Here it is assumed that the dewpoint temperature, $T_{DEW}$, of the room air is greater than the supply liquid temperature, $T_{SUPPLY}$ ($T_{DEW}>T_{SUPPLY}$).

FIG. 6A shows a relationship between cooling and flow rate for a $T_{IN}=T_{SUPPLY}$ (i.e., the input liquid temperature to the cooling coil is the temperature of the chilled liquid supply). Maximum cooling ($h_{max}$) is achieved when the flow rate of liquid through the coil ($F_{coil}$) is maximum ($F_{max}$), which represents the practical limit on flow rate that can be achieved in a particular embodiment. At very low flow rates the liquid reaches room temperature, $T_{room}$, before it reaches the end of the coil and, while $\Delta T$ is maximum, there is relatively low total cooling. In between there is a useful range where total cooling is substantial yet energy is not (potentially) being wasted with an excessive flow rate (i.e., excessive pumping energy). FIG. 6A represents the lowest SHR that can be achieved ($SHR_{min}$) by the system. All higher coil input temperatures will have a higher SHR.

FIG. 6B shows the same plot for $T_{IN}=T_{DEW}$. Notably there is not any latent cooling (SHR=100%). Also the maximum cooling that can be achieved at $F_{max}$ is substantially lower than $h_{max}$ achieved when $T_{IN}=T_{SUPPLY}$. Of course, any $T_{IN}$ above $T_{DEW}$ will also have an SHR of 100%, and the maximum total cooling will continue to go down (e.g., no cooling when $T_{IN}=T_{room}$).

The regime in between, where $T_{SUPPLY} \leq T_{IN} \leq T_{DEW}$ is used when neither maximum latent cooling nor sensible only cooling, is needed. As noted above, the higher $T_{IN}$ the higher the SHR (all else equal). FIG. 6C shows qualitatively the regime where $T_{SUPPLY} \leq T_{IN} \leq T_{DEW}$. Note that there is not a single plot for all $T_{IN}$ in this range and clearly as $T_{IN}$ approaches $T_{SUPPLY}$ or $T_{DEW}$ the plot will approach that shown in FIGS. 6A and 6B, respectively.

The concepts illustrated in these plots may be used to select a $T_{IN}$ target ($T_{IN\_target}$) and a $F_{coil}$ target ($F_{coil\_target}$) for a given target SHR and target total cooling rate (or equivalently a given target latent cooling rate and target sensible cooling rate). Once target values are calculated for $h_L$ and $h_S$ (or equivalently, h and SHR), the target $T_{IN}$ can be determined as follows. If the target SHR is less than the minimum SHR achievable by the system, $T_{IN\_target}$ is set to $T_{SUPPLY}$. The flow rate, $F_{coil}$, is controlled to achieve the desired total cooling. This could be controlled by measuring the total cooling from the air side sensors or measuring the total cooling from the flow rate and $\Delta T$ on the cooling coil. In some embodiments, the flow rate is simply maximized (i.e., set to a maximum permissible flow rate which may be lower than the pumping capability for improved energy efficiency). In some embodiments, the flow rate is controlled to achieve a target $\Delta T$.

If the target SHR is 100% a control methodology that avoids condensation can be used. For example, $T_{IN}$ may be required to be equal to or greater than $T_{DEW}$. If the target SHR is greater than the minimum SHR but less than 100% we may determine $T_{IN\_target}$, for example, based on a straight line fit between the points ($SHR_{min}$, $T_{SUPPLY}$) and (100%, $T_{DEW}$) as shown in FIG. 13 of the '031 patent application. Though other methods as further discussed herein may be used.

With respect to $F_{coil\_target}$, if the target SHR, $SHR_{target}$, is 100% the flow rate may be selected to be the optimum rate for the coil since only the sensible cooling rate can be controlled totally through water temperature. In some embodiments, the flow rate is controlled to achieve a desired $\Delta T$. IN some embodiments, the liquid input temperature could be chosen as any temperature at or above the dewpoint and the flow rate could be modulated to provide the desired total cooling.

When $SHR_{target}<SHR_{min}$ the load cannot be matched (by definition). This situation could occur, for example, because the room air temperature is close to setpoint (low or zero target for $h_S$) and humidity is well above the humidity setpoint (high $h_L$), or because the room air temperature is at or below setpoint (target for $h_S$ is 0). The system may be designed to minimize or eliminate the circumstances where such a scenario is expected. In most operating environments this condition can be largely avoided by proper system design. Because the load cannot be met, there is no ideal solution for addressing this case and design tradeoffs must be considered. Under such conditions in one embodiment the system is run with $T_{IN}=T_{SUPPLY}$ to match the sensible load and tolerating the unaddressable latent load. However, if the latent load becomes too high (e.g., above some threshold such as 60% RH), the system may be run to dry out the air, even if the air temperature falls below the setpoint temperature. In some embodiments, the conditioning unit includes an electric reheat coil to warm the air before exiting the supply air port to prevent the room from falling below the setpoint in cooling. In some embodiments, the system is run to dry the air to the desired level (e.g., without regard to room temperature) and then the system is run in heating mode to warm up the conditioned space. As heating in a cooling mode is not ideal, system design should carefully consider tradeoffs in establishing $SHR_{min}$.

When $SHR_{min} < SHR < 100\%$, $F_{coil\_target}$ may be determined, for example, based on a straight line fit between (0, 0) and $(h_{max\_for\_Tin}, F_{max})$. See FIG. 14 of the '031 patent application):

$$F_{coil\_target} = (F_{max}/h_{max\_for\_Tin}) \times h$$

The "max" cooling ($h_{max\_for\_Tin}$) is dependent upon the specific $T_{IN}$. Note FIG. 15 of the '031 patent application which plots (qualitatively) the maximum total cooling that can be achieved for the maximum permissible flow rate in the coil for each $T_{IN}$. Though it should be appreciated that $F_{coil\_target}$ may be determined in any suitable way.

Figure 7A:
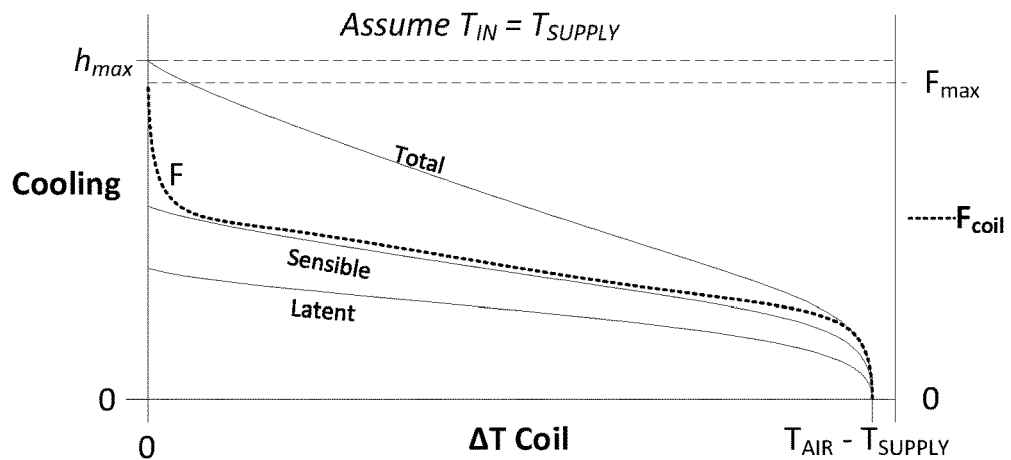
FIGS. 7A-7C is a set of plots showing a qualitative relationship between the rate of cooling, flow rate through the coil, and the change in liquid temperature across the coil ($\Delta T$), according to some embodiments.
Figure 7B:
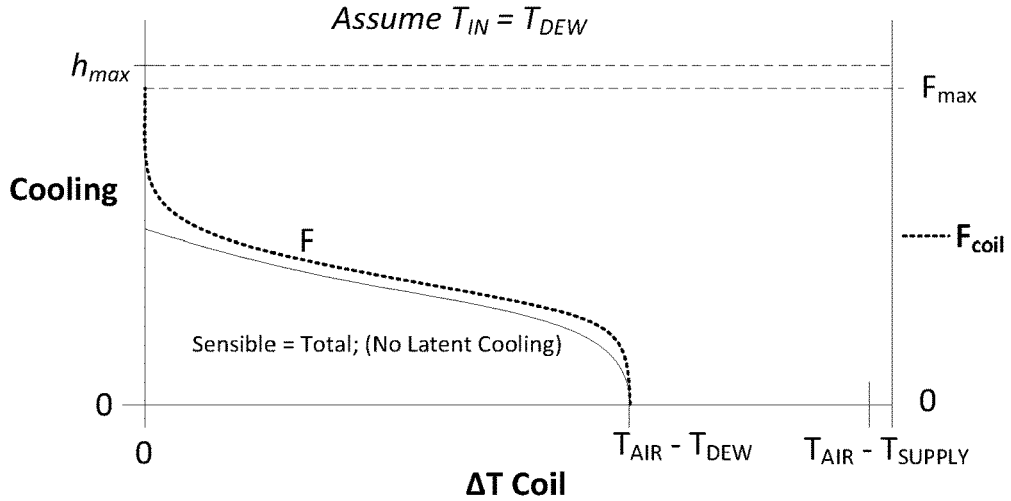
Figure 7C:
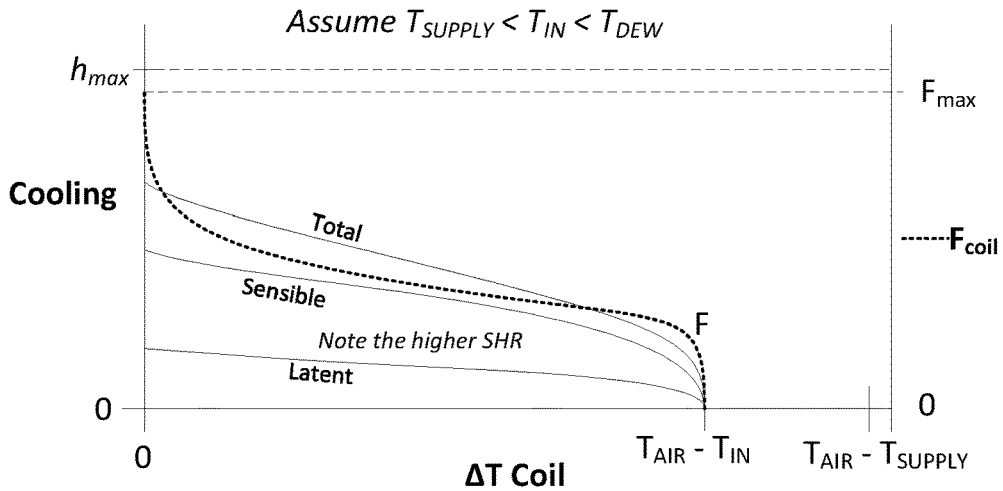

Attention is now turned to FIGS. 7A-7C which qualitatively plots total cooling, h, and coil flow rate, $F_{coil}$, as a function of $\Delta T$ for a given $T_{IN}$. In this illustration, room conditions are again assumed to have $T_{DEW} > T_{SUPPLY}$. FIG. 7A is plotted for $T_{IN} = T_{SUPPLY}$; FIG. 7B is plotted for $T_{IN} = T_{DEW}$; and FIG. 7C is plotted for $T_{SUPPLY} \leq T_{IN} \leq T_{DEW}$. Notably the $\Delta T$ range gets smaller at higher $T_{IN}$.

Figure 8:
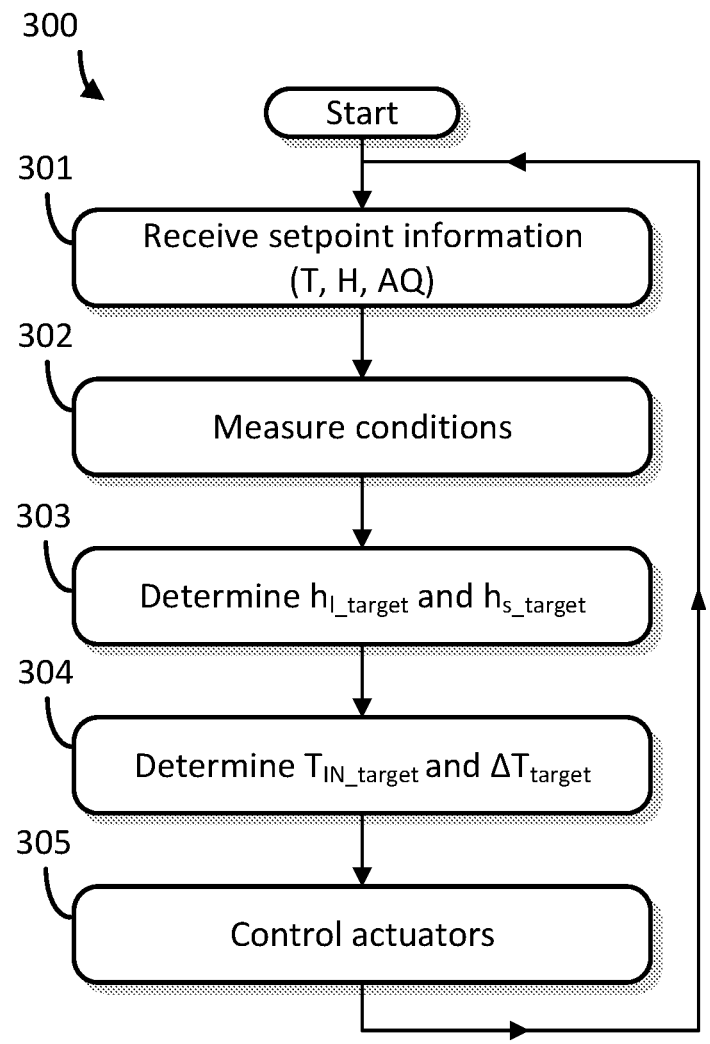
FIG. 8 is a flow diagram for a method of operating a conditioning unit, according to some embodiments.

Attention is now turned to method 300 shown in FIG. 8. Method 300 may be implemented, for example, by control module 170 of control system 101. Though, method 300 may be implemented in any suitable way.

At step 301, method 300 receives setpoint information about the temperature, humidity, and air quality desired for a conditioned space. In some embodiments, a subset of conditions are controlled for (e.g., only temperature and humidity if outdoor air is not available or of fixed supply). In some embodiments, other conditions are also controlled for. In some embodiments, the setpoints are specific scalar values. In some embodiments, setpoints are acceptable ranges. In some embodiments, ranges define a dead band. (For example, if the temperature exceeds the upper limit of the band, cool until the temperature is equal to the lower limit; once the lower limit is reached take no action until the upper limit is again exceeded.) In some embodiments, the setpoints are provided through a user interface, hard programmed, received over a communications channel, or otherwise made known to method 300 in a suitable way or combination of ways.

At step 302, relevant conditions are measured. Relevant conditions may include the room temperature, the room humidity, the room air quality, additional sensor measurements from instrumentation within the conditioning unit (e.g., from sensor suites in FIG. 4), and sensors measurements within the control system (e.g., sensors 150, 153, and 155 in FIG. 1).

At step 303, the target latent cooling ($h_{l\_target}$) and sensible cooling ($h_{s\_target}$) rates are determined (or sensible heating rate if heating is desired) based on the measured conditions. It should be appreciated that the conditioned outdoor air will provide latent and sensible heating and/or cooling of the indoor air. In some embodiments, the amount of conditioned outdoor air is determined entirely based on air quality, though the conditioned outdoor air may be controlled in any suitable way. In any case, the targets $h_{l\_target}$ and $h_{s\_target}$ should be determined with consideration of the effect of conditioned outdoor air on the system. In some embodiments, the amount of conditioned outdoor air is determined before (separately) from $h_{l\_target}$ and $h_{s\_target}$ and thus these targets may take into account the amount of latent/sensible heating/cooling conditioned outdoor air will contribute. In some other embodiments, a minimum amount of conditioned outdoor air is taken into consideration when determining $h_{l\_target}$ and $h_{s\_target}$ and the system may determine whether additional conditioned outdoor air should be used to meet the targets. If additional conditioned outdoor air would contribute in the wrong direction (e.g., latent/sensible heating when latent/sensible cooling is targeted) adding additional conditioned outdoor air would only increase the load. However, if additional conditioned outdoor air would contribute in the correct direction (e.g., latent/sensible cooling when latent/sensible cooling is targeted), it may be used as part of meeting these targets. Whether to use conditioned outdoor air or the coil to meet $h_{l\_target}$ and $h_{s\_target}$ (or in what ratio) may consider other factors such as energy efficiency. For example, if little or no energy is being used to condition outdoor air it may be preferable to utilize more conditioned outdoor air rather than heating/cooling via the coil. On the other hand, if conditioned outdoor air is "expensive", heating/cooling via the coil may be preferred. Where the conditioned outdoor air conditions contribute in one aspect (latent or sensible) and not in the other (sensible or latent) more detailed analysis may be needed to determine whether to use additional conditioned outdoor air to meet the load. Where this analysis is too computationally expensive, simpler rules may be implemented. The simplest rule, perhaps, is to only utilize the conditioned outdoor air needed for air quality and assume that conditioned outdoor air is simply part of the load that must be borne by the coil.

In some embodiments when the measured temperature or humidity is away from the set point the rate of sensible or latent cooling, respectively, is desired to be maximum until the setpoint is met. That is, the system may be operated at its maximum operating level to minimize the time it takes to reach the setpoints. Once the setpoint(s) are reached the system simply has to match the load. It can do this in part by continuously measuring what the load is and adjusting the amount of latent and sensible cooling provided to match it. Measuring the load may consist of measuring the amount of latent and sensible cooling being delivered and seeing if there is a change in air conditions from setpoint. If there is a change from setpoint either too much or too little cooling has been provided and the system can adjust using feedback control (e.g., using a P, PI, or PID controller). The '972 application and '031 application provide examples of how the sensible and latent load can be measured using a suite of sensors as part of the conditioning system.

While some specifics of implementing step 303 are implementation dependent, a few illustrations are helpful. The discussion focuses on the cooling rates, however, the heating rates are analogous and may be simpler because latent heating (adding humidity to the air) may not be provided by the system in many practical embodiments.

If the temperature and humidity of the room are far above their setpoints, latent cooling is maximized. This is because the system can provide sensible cooling without latent cooling, but it can only provide, via the cooling coil, latent cooling with sensible cooling. Once the backlog of latent load has been satisfied, that is once the humidity setpoint is reached, the rate of latent cooling can be reduced to match the load (i.e., the rate of latent heating).

If the temperature is above the setpoint but the latent conditions are met, or close to met, the rate of latent cooling needed to match the latent load should be determined, and then that level of latent cooling should be provided while maximizing sensible cooling to satisfy the sensible cooling backlog. Once the sensible cooling backlog has been met, both sensible and latent cooling levels can be determined based on matching the load.

If the temperature is near setpoint but the latent backlog is high, the system will not be able to satisfy the latent backlog without excessive sensible cooling. (Under some conditions, it may be possible to bring in warm dry conditioned air to allow for latent cooling while offsetting for sensible cooling.) Since it may not be possible to satisfy both the temperature and humidity setpoints, one will have to be prioritized over the other based on the specific requirements of the particular embodiments.

Once the humidity and temperature setpoints have been reached, the system needs only match the load. The sensor measurements may be used to calculate the actual rates of sensible and latent cooling. With the actual rates observed and the actual conditions observed it is possible to determine if the rates should be increased or decreased or held. Thus, $h_{l\_target}$ and $h_{s\_target}$ can be determined from sensor measurements of the actual rates $h_l$ and $h_s$, and the rates of change in the room temperature and room humidity.

At step 304, $h_{l\_target}$ and $h_{s\_target}$ are used to determine the target input temperature to the coil, $T_{IN\_target}$, and the target delta T, $\Delta T_{target}$. Note that if $T_{IN\_target}$ is defined it is entirely equivalent to specify $\Delta T_{target}$ or $T_{OUT\_target}$. While this disclosure generally prefers to refer to $T_{IN\_target}$ and $\Delta T_{target}$, it should be appreciated that this is entirely equivalent to specifying $T_{IN\_target}$ and $T_{OUT\_target}$ since $\Delta T_{target} = T_{IN\_target} - T_{OUT\_target}$ (and further noting that $\Delta T_{target}$ may also be defined as $T_{OUT\_target} - T_{IN\_target}$ and the difference in sign merely need be accounted for appropriately to avoid improper feedback.

In some embodiments, other control variables are utilized to achieve $h_{l\_target}$ and $h_{s\_target}$. For example, speed of fan 341 as well as the position of dampers 317 and 321 in conditioning unit 232 (FIG. 4) may be utilized to influence how $h_{l\_target}$ and $h_{s\_target}$ are met. In some embodiments, a database of empirical or simulated data is used as a lookup table for determining $T_{IN\_target}$ and $\Delta T_{target}$. As the plots in FIG. 7A-7C illustrated, $h_{l\_target}$ and $h_{s\_target}$ may be used to determine the appropriate $T_{IN\_target}$ and $\Delta T_{target}$. Such plots (or their equivalent) may be generated and stored in a database accessible to method 300. In some embodiments step 304 determines $T_{IN\_target}$ and $F_{coil\_target}$ using a similar database. In some embodiments, a system model is run by control system 101 to determine $T_{IN\_target}$ and $\Delta T_{target}$. The system model may comprise a computational model of the control system, the conditioning unit, the flow of liquid within the control system and coil, and the flow of air within the conditioning unit.

In some embodiments, the database or model takes/has as inputs $h_{l\_target}$, $h_{s\_target}$, $T_{room}$, and $H_{room}$ and takes/has as outputs a suitable combination of $T_{IN}$, $T_{OUT}$, $\Delta T$, $F_{coil}$, the fan speed, and the position of dampers. Though the database or system model may utilize any suitable set of variables.

In some embodiments, the database is generated and stored within the control system before installation of the control system into a conditioned space. For example, the database may be generated as part of a design and testing of the system in a laboratory setting that simulates a wide variety of operating conditions which are then used to populate the database. In some embodiments, the database is generated from computer simulation of the system. In some embodiments, the database utilizes both computer simulation and empirical test results. In some embodiments, the database is generated as part of initial testing after installation.

In some embodiments, the database is calibrated based on initial testing after installation. For example, data may be collected by the installed system and then compared to the databases anticipated results for the same circumstances. The entire database can then be calibrated (e.g., scaled and shifted based on a small number of datapoints collected by the installed system.

In some embodiments, the model or database is used to provide an initial guess of the correct control variable values and then feedback control is used to make adjustments. For example, once the operation of the actuators (e.g., control pump 136, recirculation pump 120, fan 341 and dampers 317, 321 and 331) have been set, sensor suites 312, 314, 322, 332 and 342 (as applicable) may be used to measure the rates of latent and sensible cooling/heating. Feedback control (e.g., PI, PID) may be used to adjust $T_{IN\_target}$ and $\Delta T_{target}$ based on the measured $h_l$ and $h_s$ versus $h_{l\_target}$ and $h_{s\_target}$. As discussed in the '031 application, conservation principles may be used to calculate $h_l$ and $h_s$ or equivalently h and SHR. An internal air port 390 is shown on FIG. 4 to illustrate a reference for applying conservation principles (since coil 233 will introduce energy exchange to the system relative to recirculation air port 310).

To illustrate an example, if $h_{l\_target}$ and $h_{s\_target}$ are specified as "maximum" values (i.e., the maximum sensible and latent cooling the system can provide), $T_{IN\_target}$ may be specified as $T_{SUPPLY}$ (or lower) and $\Delta T_{target}$ may be specified as some minimum acceptable value. That is because, generally both sensible and latent cooling will be maximized at lower $\Delta T$, however, running a low $\Delta T$ results in excessive pumping and is not efficient. Accordingly, a minimum $\Delta T$ may be specified as the target $\Delta T$. If $\Delta T$ is specified as zero the control pump 136 will be run at full speed which may be either desirable (to reach the set points as quickly as possible) or wasteful (since higher liquid flow rates may have diminishing performance returns). Whether a minimum $\Delta T$ should be specified and what it should be, thus is particular to the specific embodiment and preferences of the applicable decision maker (e.g., engineer, designer, end user). In some embodiments, such preferences may be specified as additional inputs (e.g. through user interface 181) or via a BMS control signal received via port 174.

To illustrate another example, if $h_{l\_target}$ is zero and $h_{s\_target}$ is positive, $T_{IN\_target}$ should be set above the dewpoint to avoid latent cooling. (Note, in practice, latent cooling can even be avoided at temperatures somewhat below the dewpoint because the temperature of the coil where air makes contact does not actually get to the dew point or below.) $\Delta T_{target}$ can be specified based on tradeoffs between maximizing the rate of cooling and energy efficiency.

To illustrate another example, if $h_{l\_target}$ is positive and $h_{s\_target}$ is positive, $T_{IN\_target}$ should be set above the dew point to avoid latent cooling. (Note, in practice, latent cooling can even be avoided at temperatures somewhat below the dew point because the temperature of the coil where air makes contact does not actually get to the dewpoint or below.) $\Delta T_{target}$ can be specified based on tradeoffs between maximizing the rate of cooling and energy efficiency.

To illustrate another example, if $h_{l\_target}$ is "large" positive and $h_{s\_target}$ is "small" positive or zero, the control system probably cannot utilize the coil to improve room conditions since latent cooling is always accompanied by sensible cooling. A decision maker will have to determine if satisfying the latent load even at the cost of over cooling the conditioned space is acceptable. Some embodiments will evaluate whether additional conditioned outdoor air could be used to assist in remedying this circumstance. For example, if the conditioned outdoor air were warm and dry more conditioned outdoor air would contribute to latent cooling and the cooling coil could provide additional latent cooling (if needed) and sensible cooling to offset the sensible heating provided by the additional outdoor air.

To illustrate another example, if both $h_{l\_target}$ and $h_{s\_target}$ are positive, but not maximum, $T_{IN\_target}$ and $\Delta T_{target}$ may be specified to provide the right balance of $h_{l\_target}$ and $h_{s\_target}$ based on the database or model. If the database or model have been utilized to "guess" the best $T_{IN\_target}$ and $\Delta T_{target}$ these variables may be adjusted to incrementally meet the load. For example, if the database/model guess for $T_{IN\_target}$ and $\Delta T_{target}$ has an SHR that is a little too high, $T_{IN\_target}$ could be lowered a bit. Similarly, if the guess results in a good SHR but the total cooling is too low, $\Delta T_{target}$ could be lowered a bit to increase total cooling.

In some embodiments, the database/model is refined based on actual measurements in the installed location. Since the database or model may have been generated based on ideal product or laboratory conditions, corrective updates may be helpful in providing better guesses since the updates would be based on actual operating conditions of the actual installed hardware in the installed location. Care of course is needed to avoid modifying the database where assumptions may have been incorrect. For example, if the database assumes $T_{SUPPLY}$ temperature and the actual $T_{SUPPLY}$ was very different (and possibly not known for lack of measurement) updating the database or model based on such data could result in bad guesses—particularly if $T_{SUPPLY}$ then returns to its intended temperature.

In some embodiments, the database may be stored on a non-transitory computer readable storage media such as memory 401 in FIG. 5. In some embodiments, the model may be stored on a non-transitory computer readable storage media (e.g., memory 401) as computer-code that when executed by one or more processors computes results. Processor 402, for example, may be used for execution. Though the database and/or the model may be stored and utilized in any suitable way.

It should be appreciated that there may be multiple ways to achieve the desired $h_{l\_target}$ and $h_{s\_target}$. However, additional constraints may be placed on the problem to avoid operating conditions that are considered undesirable. For example, in some embodiments there is a preference to operate at the highest $\Delta T$ (lowest $F_{coil}$) that provides a solution. In some embodiments, it may be preferred to operate at lower fan speeds and higher flow rates rather than higher fan speeds and lower flow rates. This preference may be reversed in some other embodiments. As mentioned above, there may also be no fully satisfactory solution for meeting the setpoints, and a compromise solution may be required. A ready example of such a situation is when sensible cooling is not needed but latent cooling is needed.

At step 305, the control actuators are controlled to meet the targets. For example, actuator 130 and recirculation pump 120 may be controlled to meet a $T_{IN\_target}$ and $\Delta T_{target}$ using suitable feedback control (e.g, PI or PID controller).

Consider a first example where control system 101 is operated to control the liquid temperature flowing through load input port 115 to a target load input temperature, $T_{IN\_target}$. The actual $T_{IN}$ temperature may be measured, for example, by sensor 150. Cooling mode is discussed and can easily be adapted for heating mode. It is assumed that (i) the cold liquid supply temperature is known (e.g., because it is fixed at a known temperature, measured by sensor 153, received from a BMS via data port 174); (ii) recirculation pump 120 is a fixed speed pump; (iii) the target load input temperature is known (from step 304).

If the target load input temperature is at or below the cold liquid supply temperature, recirculation pump 120 is turned off and actuator 130 passes liquid. In embodiments, where actuator 130 comprises a control pump 136 and a binary control valve 133, control valve 133 is open and control pump 136 is on. In this special case, feedback control is not needed to control $T_{IN}$ since the coldest $T_{IN}$ that can be achieved is being called for and being met by not providing any recirculation via recirculation pump 120. Thus, in some embodiments control pump 136 may be modulated to match a target $\Delta T$ based on measurements from sensor 150 ($T_{IN}$) and 155 ($T_{OUT}$), for example, using a proportion-integral (PI) or proportional-integral-differential PID) controller or any other suitable controller.

If the target load input temperature is at or above room temperature, $T_{room}$, no cooling is required and recirculation pump 120 is off, control valve 133 is fully closed, and control pump 136 is off. Equivalently, actuator 130 does not permit liquid flow. This condition turns off cooling and may occur, for example, if the setpoint temperature in the room is above the room temperature. (Note that cooling, not heating, is specifically being considered here. Of course in heating $T_{IN\_target}$ will generally be above room temperature and heating called for.)

If the target load input temperature is above the cold liquid supply temperature and below room temperature, recirculation pump 120 is turned on, control valve 136 is open, and control pump 136 is modulated to match the target load input temperature. An appropriate feedback control scheme may be used to control pump 136. (As noted, this specific example assumes that recirculation pump 120 is a fixed speed pump and thus only ON/OFF control is available.

Consider a second example with the same conditions except that the recirculation pump 120 is a variable speed pump. Again, cooling mode is discussed and can easily be adapted for heating mode. If the target load input temperature is below the cold liquid supply temperature ($T_{IN\_target} < T_{SUPPLY}$) or above the room temperature ($T_{IN\_target} > T_{room}$), operation is the same as in the first example. In conditions where the target load temperature is between the cold liquid temperature and the room temperature the control valve is opened and the control pump and recirculation pump are modulated to control both the input temperature and $\Delta T$ to meet the respective targets.

Modulation of the control and recirculation pumps is implemented through a feedback control system. It is noted that $\Delta T$ is inversely related to the flow rate of liquid through the conditioning unit, $F_{coil}$. The higher the flow rate the lower the $\Delta T$ and the lower the flow rate the higher the $\Delta T$ (assuming a constant $T_{IN}$). This is appreciated by noting that at very high flow rates there is not enough time for the air to fully warm the liquid in the coil, while at very low flow rates the liquid in the coil will reach room temperature before it exits the coil (noting that if $T_{OUT}$ is equal to the room temperature, $\Delta T$ is necessarily the largest that can be achieved for the given $T_{IN}$. It is further noted that $T_{IN}$ is related to the ratio of supply liquid provided at temperature $T_{SUPPLY}$ and the recirculation liquid provided at temperate $T_{OUT}$. It is further noted that $T_{OUT}$ will lag $T_{IN}$ by the time it takes for the liquid at temperature $T_{IN}$ to pass through the conditioning unit, return through port 116 and be measured by sensor 155. Accordingly, feedback control of $\Delta T$ must take in account this delay.

In one embodiment, the control system first adjusts the temperature of the liquid combined at junction 161 by adjusting the ratio of the pump speeds for the supply liquid and the recirculation liquid. Once $T_{IN}$ is at target, $T_{OUT}$ is measured (in some embodiments after accommodating for its lag) to determine $\Delta T$. If $\Delta T$ is too low the pumps are slowed down in proportion to each other so as to maintain $T_{IN}$ while reducing flow rate. If $\Delta T$ is too high the pumps are sped up in proportion to each other so as to maintain $T_{IN}$ while increasing flow rate. This process may be implemented to continuously adjust to meet the target input temperature and target $\Delta T$ (which themselves will vary over time).

As discussed above, $F_{coil}$, the flow rate of liquid through the coil may be the target parameter rather than $\Delta T$. In such embodiments, sensor 150 or 155 may include a flow rate sensor to permit feedback control of $F_{coil}$. An $F_{coil\_target}$ may be determined in similar ways as discussed above in connection with the determination of $\Delta T_{target}$. If sensor 150 includes both a temperature and flow rate sensor, sensor 155 may not be needed in such an embodiment. The control to a target $T_{IN}$ and a target $F_{coil}$ is similar as for a target $T_{IN}$ and a target $\Delta T$ because of the relationship between $\Delta T$ and $F_{coil}$.

An advantage of using $F_{coil}$ over $\Delta T$ is that $F_{coil}$ can be measured in real-time with $T_{IN}$ while $\Delta T$ has a lag with respect to $T_{IN}$. A disadvantage is that flow rate sensors are commonly more expensive than temperature sensors. Note that regardless of whether $F_{coil}$ or $\Delta T$ is used for control, if $T_{IN}$, $T_{OUT}$ and $F_{coil}$ are measured the total cooling provided by the cooling coil can be directly and accurately measured. This can be compared to total cooling measurements provided from measurement of the air flows in conditioning unit 232. The '031 application, for example, discusses how $h_l$, $h_s$ (and thus h) may be measured from the air flows in the terminal unit/conditioning unit.

Method 300 may be implemented in any suitable way. In some embodiments, method 300 is implemented using the control system 101. For example, the method may be implemented as computer executable code stored on memory 401 that is executed by processor 402. After step 305 method 300 may repeat in any suitable way and for any suitable number of times. As illustrated, method 300 returns to step 301 after step 305. It should be appreciated however that not all steps of method 301 may be present in all embodiments, and not all steps may be performed in each iteration of method 300. In some embodiments, method 300 includes additional steps. In some embodiments, method 300 includes some additional steps and also lacks certain illustrated steps.

Having thus described several aspects of at least one embodiment of this invention, it is to be appreciated that various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

It should be appreciated that the connections between the hydraulic components shown in the drawings and described with reference to embodiments of control systems, liquid supply systems, conditioning systems, and the like may be achieved by any suitable pipe, hose, tube, conduit, or other mechanism for conveying liquid under pressure. Where such connections have been described as a specific hydraulic conveyance it should be appreciated that other embodiments may use hose, tube, conduit, or any other suitable hydraulic conveyance.

It should be appreciated that any suitable liquid may be used in embodiments of the systems and method disclosed herein. For example, in some embodiments, the liquid is water, or water containing additives such as glycol to improve certain aspects of performance. Though any suitable liquid may be used.

It should be appreciated that while some embodiments were described with respect to cooling a conditioned space, the embodiments may be applicable to heating a conditioned space. Those of skill in the art will appreciate that some embodiments may be used for heating without modification or with only minor modifications.

It should be appreciated that all mechanical and end electrical equipment will have functional limitations. Generally, the ideal behavior has been described so as to not unnecessarily distract from the general operation and description of the embodiments. Those of skill in the art will recognize and appreciate the need to consider both ideal and non-ideal behavior in designing specific embodiments just as with any electrical or mechanical device.

It should also be appreciated that the descriptions of components having the same name or same reference number appear in multiple drawings so as to avoid having to describe the common aspects of a component multiple times. It should be clear to those of skill in the art whether such descriptions made with reference to one embodiment are applicable to another embodiment.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appearing in this specification may be modified by a term of degree thereby reflecting their intrinsic uncertainty.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system comprising:
   a supply input port;
   a load return port;
   a recirculation pump for pumping liquid from a pump input port to a pump output port, the pump input port connected to receive a first portion of liquid flowing from the load return port;
   a junction to combine liquid flowing from the pump output port with liquid flowing from the supply input port;
   a load input port to receive such combined liquid from the junction;
   a supply return port connected to receive a remaining portion of the liquid flowing from the load return port;
   an actuator comprising a control pump to control flow of liquid between the supply input port and the supply return port at least in part by modulating a speed of the control pump;
   a sensor to measure a property of the liquid flowing through the load input port; and
   a control module to control the control pump and the recirculation pump based at least in part on a measurement from the sensor.

2. The system of claim 1, wherein the sensor is a first temperature sensor and the property is temperature and the recirculation pump is a variable-speed recirculation pump, the system further comprising a second temperature sensor to measure a temperature of the liquid flowing into the load return port, wherein the control module modulates the control pump and modulates the recirculation pump to achieve a target temperature at the first temperature sensor and to simultaneously achieve a target temperature difference between the two temperature sensors.

3. The control system of claim 2, wherein the control module determines the target temperature and the target temperature difference between the two temperature sensors based at least in part on a temperature of a conditioned space, a humidity of the conditioned space, a target temperature of the conditioned space, and a target humidity of the conditioned space.

4. The control system of claim 3, further comprising a flow rate sensor to measure a flow rate of the liquid flowing through the load input port, wherein the control module calculates an energy transfer rate based on the flow rate and a temperature difference between the two temperature sensors, and adjusts the modulation of the control pump and the recirculation pump in response to the energy transfer rate being different from a target energy transfer rate.

5. The control system of claim 1, wherein the actuator further comprises a control valve operably connected in series with the control pump and the control module at least partially opens the control valve during operation of the control pump.

6. The control system of claim 5, wherein the control valve has two states, fully open, and fully closed, the control module transmits to the control valve a binary control signal specifying one of the two states, and the control module fully opens the control valve during operation of the control pump.

7. The control system of claim 5, wherein the control valve is a modulated control valve and the control module transmits to the control valve a control signal specifying a position of the control valve.

8. The control system of claim 1, wherein the sensor comprises a first temperature sensor to measure a temperature of the liquid flowing through the load input port, and a flow rate sensor to measure a flow rate of the liquid flowing through the load input port, the recirculation pump is a variable-speed recirculation pump, and the control module modulates the control pump and the recirculation pump to achieve a target temperature at the first temperature sensor and a target flow rate at the flow rate sensor.

9. The control system of claim 1, wherein the control pump in an OFF state prevents flow of liquid between the supply input port and the supply return port.

10. A system for conditioning air in a conditioned space, the system comprising:
- a conditioning unit having
  - a mixing chamber;
  - a recirculation air port for receiving first recirculation air and connected to the mixing chamber by a first duct;
  - a cooling coil having an coil input port and a coil output port, the cooling coil within the first duct;
  - a fan to generate the flow of first recirculation air through the cooling coil;
  - a conditioned air port for receiving conditioned air and connected to the mixing chamber by a second duct; and
  - a supply air port for providing supply air port for providing supply air, the supply air port connected to the mixing chamber; and
- a control system having:
  - a supply input port;
  - a load return port connected to the coil output port to receive liquid returning from the cooling coil;
    - a recirculation pump for pumping liquid from a pump input port to a pump output port, the pump input port operably connected to receive a first portion of liquid flowing from the load return port;
    - a junction to combine liquid flowing from the pump output port with liquid flowing from the supply input port;
    - a load input port to receive the combined liquid from the junction, the load input port operably connected to the coil input port and to provide the combined liquid to the coil;
  - a supply return port connected to receive a remaining portion of the liquid flowing from the load return port;
    - an actuator comprising a control pump to control flow of liquid between the supply input port and the supply return port at least in part by modulating a speed of the control pump;
    - a sensor to measure a property of the liquid flowing through the load input port; and
    - a control module to control the control pump and the recirculation pump based at least in part on a measurement from the sensor.

11. The system of claim 10, wherein
the sensor is a first temperature sensor and the property is a first temperature;
the control system further comprises a second temperature sensor for measuring a second temperature of the liquid flowing through the load return port;
the control module determines a target rate of latent cooling and a target rate of sensible cooling based at least in part on a temperature of the air in the conditioned space, a humidity of the conditioned space, a target temperature of the conditioned space, and a target humidity of the conditioned space;
the control module determines a target temperature for liquid entering the cooling coil and a target temperature for liquid exiting the cooling coil based at least in part on the target rate of latent cooling and the target rate of sensible cooling; and
the control module controls the control pump and the recirculation pump to achieve the target temperature for liquid entering the cooling coil and the target temperature for liquid exiting the cooling coil.

12. The system of claim 11, further comprising a plurality of sensors to measure a rate of latent cooling and a rate of sensible cooling provided through the conditioning unit, wherein the control module determines the target rate of latent cooling and the target rate of sensible cooling based at least in additional part on the measured rate of latent cooling and the measured rate of sensible cooling.

13. The system of claim 10, wherein
the sensor is a temperature sensor and the property is temperature;
the control system further comprises a flow rate sensor to measure a flow rate of liquid through the cooling coil;
the control module determines a target rate of latent cooling and a target rate of sensible cooling based at least in part on a temperature of the air in the conditioned space, a humidity of the conditioned space, a target temperature of the conditioned space, and a target humidity of the conditioned space;

the control module determines a target temperature for liquid entering the cooling coil and a target flow rate for liquid flowing through the cooling coil based at least in part on the target rate of latent cooling and the target rate of sensible cooling; and the control module controls the control pump and the recirculation pump to achieve the target temperature for liquid entering the cooling coil and the target flow rate for liquid flowing through the cooling coil.

14. The system of claim 13, further comprising a plurality of sensors to measure a rate of latent cooling and a rate of sensible cooling provided through the conditioning unit, wherein the control module determines the target rate of latent cooling and the target rate of sensible cooling based at least in additional part on the measured rate of latent cooling and the measured rate of sensible cooling.

15. The system of claim 13, wherein the control system further comprises a non-transitory computer-readable storage medium having recorded thereon a database relating at least latent cooling rate and latent heating rate to temperature for liquid entering the cooling coil and flow rate for liquid through the cooling coil; and the control module determines the target temperature for liquid entering the cooling coil and the target flow rate for liquid flowing through the cooling coil based at least in part from a look-up from the database.

16. The system of claim 15, wherein the control module updates the database based on measurements of latent cooling rate, latent heating rate, the temperature for liquid entering the cooling coil and the flow rate for liquid through the cooling coil.

17. The system of claim 15 wherein the control module determines the target temperature for liquid entering the cooling coil and the target flow rate for liquid flowing through the cooling coil by interpolating between two or more entries in the database.

18. A system comprising:

a supply input port;

a load return port;

a variable-speed recirculation pump for pumping liquid from a pump input port to a pump output port, the pump input port connected to receive a first portion of liquid flowing from the load return port;

a junction to combine liquid flowing from the pump output port with liquid flowing from the supply input port;

a load input port to receive such combined liquid from the junction;

a supply return port connected to receive a remaining portion of the liquid flowing from the load return port;

an actuator comprising a variable-speed control pump to control flow of liquid between the supply input port and the supply return port at least in part by modulating a speed of the control pump;

a temperature sensor to measure a temperature of the liquid flowing through the load input port;

a second sensor to measure a property of the liquid flowing through the load return port; and a control module to modulate the control pump and modulate the recirculation pump based at least in part on a measurement from the temperature sensor and the measurement from the second sensor.

19. The system of claim 18, wherein the second sensor is a temperature sensor and the property is a temperature of liquid flowing through the load return port.

20. The system of claim 13, wherein the control module determines the target temperature for liquid entering the cooling coil and the target flow rate for liquid flowing through the cooling coil by executing a computational model of the system.

21. The system of claim 18, wherein the second sensor is a liquid flow rate sensor and the property is the flow rate of liquid through the load return port.

* * * * *